United States Patent
Chen et al.

(10) Patent No.: US 12,151,964 B2
(45) Date of Patent: Nov. 26, 2024

(54) TENSION-BASED METHODS FOR FORMING BANDWIDTH TUNED OPTICAL FIBERS FOR BI-MODAL OPTICAL DATA TRANSMISSION

(71) Applicant: CORNING INCORPORATED, Corning, NY (US)

(72) Inventors: Xin Chen, Painted Post, NY (US); Kangmei Li, Painted Post, NY (US); Ming-Jun Li, Horseheads, NY (US); Snigdharaj Kumar Mishra, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 1161 days.

(21) Appl. No.: 16/936,991

(22) Filed: Jul. 23, 2020

(65) Prior Publication Data

US 2021/0032153 A1   Feb. 4, 2021

Related U.S. Application Data

(60) Provisional application No. 62/880,242, filed on Jul. 30, 2019.

(51) Int. Cl.
  *C03B 37/025*  (2006.01)
  *G02B 6/02*    (2006.01)
  (Continued)

(52) U.S. Cl.
  CPC ...... *C03B 37/0253* (2013.01); *C03B 37/0256* (2013.01); *G02B 6/02395* (2013.01);
  (Continued)

(58) Field of Classification Search
  CPC .......... G02B 6/0288; G02B 6/02; G02B 6/03; C03B 2205/40; C03B 37/0253; C03B 2203/02; C03B 37/02
  See application file for complete search history.

(56) References Cited

U.S. PATENT DOCUMENTS

| | | | |
|---|---|---|---|
| 5,073,179 A | | 12/1991 | Yoshimura et al. |
| 5,894,537 A | * | 4/1999 | Berkey ............. C03B 37/01493 385/123 |

(Continued)

FOREIGN PATENT DOCUMENTS

WO   WO-2015125555 A1 *  8/2015   ....... C03B 37/01807

OTHER PUBLICATIONS

Kao et al., "Comparison of single-/few-/multi-mode 850 nm VCSELs for optical OFDM transmission", vol. 25, No. 14, Jul. 10, 2017, Optics Express, 16347, 17 pages.

(Continued)

*Primary Examiner* — Alison L Hindenlang
*Assistant Examiner* — Steven S Lee
(74) *Attorney, Agent, or Firm* — Kevin L. Bray

(57) ABSTRACT

Methods of forming a bandwidth-tuned optical fiber for short-length data transmission systems include establishing a relationship between a change $\Delta\tau$ in a modal delay $\tau$, a change $\Delta T$ in a draw tension T and a change $\Delta\lambda$ in a BM wavelength $\lambda$ of light in a BM wavelength range from 840 nm and 1100 nm for a test optical fiber drawn from a preform and that supports BM operation at the BM wavelength. The methods also include drawing from either the preform or a closely related preform the bandwidth-tuned optical fiber by setting the draw tension based on the established relationships of the aforementioned parameters so that the bandwidth-tuned optical fiber has a target bandwidth greater than 2 GHz·km at a target wavelength within the BM wavelength range.

23 Claims, 15 Drawing Sheets

(51) Int. Cl.
*G02B 6/028* (2006.01)
*G02B 6/036* (2006.01)

(52) U.S. Cl.
CPC ....... *G02B 6/0281* (2013.01); *G02B 6/03627* (2013.01); *G02B 6/0365* (2013.01); *C03B 2203/26* (2013.01); *C03B 2205/40* (2013.01)

(56) References Cited

U.S. PATENT DOCUMENTS

| | | | |
|---|---|---|---|
| 6,535,677 B1 * | 3/2003 | Tanaka | G02B 6/02271 |
| | | | 385/127 |
| 6,885,802 B2 | 4/2005 | Oliveti et al. | |
| 6,947,637 B2 | 9/2005 | Smith | |
| 7,746,454 B2 | 6/2010 | Laing et al. | |
| 7,773,848 B2 | 8/2010 | Bookbinder et al. | |
| 7,926,304 B2 | 4/2011 | Costello et al. | |
| 8,322,166 B2 * | 12/2012 | Bookbinder | C03B 37/0253 |
| | | | 65/537 |
| 8,588,569 B2 | 11/2013 | Bookbinder et al. | |
| 8,666,214 B2 | 3/2014 | Bookbinder et al. | |
| 8,891,925 B2 | 11/2014 | Bickham et al. | |
| 9,279,741 B2 | 3/2016 | Bennett et al. | |
| 10,131,566 B2 | 11/2018 | Bowker et al. | |
| 2002/0005052 A1 | 1/2002 | Uhm | |
| 2002/0066292 A1 | 6/2002 | Wang | |
| 2003/0161597 A1 * | 8/2003 | Berkey | G02B 6/02019 |
| | | | 385/123 |
| 2012/0321261 A1 * | 12/2012 | Haruna | C03C 3/06 |
| | | | 65/435 |
| 2013/0029038 A1 * | 1/2013 | Bickham | C03B 37/01413 |
| | | | 427/163.2 |
| 2013/0077926 A1 * | 3/2013 | Bickham | G02B 6/0288 |
| | | | 385/124 |
| 2014/0119701 A1 * | 5/2014 | Chen | G02B 6/0281 |
| | | | 385/124 |
| 2016/0266308 A1 * | 9/2016 | Bookbinder | G02B 6/0365 |
| 2016/0274304 A1 * | 9/2016 | Bickham | H04B 10/2507 |
| 2017/0047997 A1 * | 2/2017 | Chen | H04B 10/516 |
| 2018/0079677 A1 * | 3/2018 | Bookbinder | C03B 37/018 |
| 2019/0016624 A1 * | 1/2019 | Bowker | C03B 37/0253 |
| 2019/0101694 A1 * | 4/2019 | Bookbinder | G02B 6/02 |

OTHER PUBLICATIONS

Lu et al., "The effect of processing parameters on glass fiber birefringence development and relaxation", Journal of Non-Newtonian Fluid Mechanics, vol. 86, Issues 1-2, Sep. 15, 1999, pp. 89-104.

Paul et al., "Effect of Fiber Drawing Tension on Optical and Mechanical Properties of Optical Fiber Waveguides", Journal of the American Ceramic Society, vol. 66, No. 5, May 1993, pp. C-84-C-85.

* cited by examiner

TENSION-BASED METHODS FOR FORMING BANDWIDTH TUNED OPTICAL FIBERS FOR BI-MODAL OPTICAL DATA TRANSMISSION

This Application claims priority under 35 USC § 119(e) from U.S. Provisional Patent Application Ser. No. 62/880,242, filed on Jul. 30, 2019, and which is incorporated by reference herein in its entirety.

FIELD

The present disclosure generally relates to methods of forming an optical fiber using a fiber drawing system, and more particularly relates to tension-based methods for forming bandwidth-tuned optical fibers for bi-modal optical data transmission.

BACKGROUND

Standard single mode optical fiber is the preferred type of optical fiber for use in hyperscale data centers because it has a higher bandwidth than multimode fibers, which provides benefits of higher data rate, longer system reach and future-proof. Hyperscale data centers also include short optical links in the range from 1 meter to 100 meters. For this short-distance range, multimode fibers are preferred, especially when used with multimode light sources, such as vertical cavity surface emitting lasers (VCSELs).

On the other hand, hyperscale data center operators prefer to use standard single mode optical fiber for both the short and long optical data links to simplify fiber cable management. Unfortunately, this simplified cable management approach comes at the expense of optical transmission performance for the short-distance optical links that use multimode light sources because standard single mode optical fibers have relatively poor bandwidth performance at the wavelength range of the multimode light sources. Also, it is difficult to efficiently couple the light from a multimode VCSEL into standard single mode optical fibers due to mismatched optical properties.

Optical fibers suitable for both single mode and few mode data transmission for use with VCSELs have been developed. However, due to manufacturing errors, it can be difficult to form such optical fibers to have the exact refractive index profile that yields a suitably high or optimum (target) bandwidth for few mode operation within a select wavelength band or at a select wavelength of interest for optical data transmission when using a multimode light source such as a VCSEL.

SUMMARY

Single mode (SM) VCSELs can offer better data transmission performance than multimode (MM) VCSELs over multimode fibers. SM or few mode (FM) VCSELs can be made through similar process as multimode (MM) VCSELs with similar costs. On the other hand, the lower numerical aperture (NA) and smaller spot size of the light emitted from SM VCSELs make them more suitable for launching into smaller core optical fibers. VCSELs typically operate at a wavelength of 850 nm, but it is also feasible for VCSELs to be made for operating at one or two wavelengths in the range from 850 nm to 1100 nm, e.g., at 850 nm and at 910 nm. For such wavelengths, a standard SM fiber (e.g., Corning® SMF-28® Ultra optical fiber) designed for SM operation at wavelengths above 1260 nm (the cable cut-off wavelength) can support a few modes, such as two or three mode groups, but with poor bandwidth since a standard SM fiber is not optimized for bandwidth performance below its cut-off wavelength.

The fibers formed using the draw tensioning methods disclosed herein are bandwidth tuned, meaning that they are formed to have suitably high if not optimal bandwidth for BM (bimodal) operation at a select (target) wavelength $\lambda$ in a BM wavelength range from 850 nm to 1100 nm.

An embodiment of the disclosure is directed to a method of forming a bandwidth-tuned optical fiber for short-length data transmission systems, comprising: a) establishing a relationship between a change $\Delta\tau$ in a modal delay $\tau$, a change $\Delta T$ in a draw tension T and a change $\Delta\lambda$ in a bimodal (BM) wavelength $\lambda$ of light in a BM wavelength range from 840 nm and 1100 nm for a test optical fiber that supports BM operation at the BM wavelength; and b) drawing the bandwidth-tuned optical fiber by setting the draw tension based on said relationship between the change in the modal delay $\Delta T$, the change in the draw tension $\Delta T$ and a change $\Delta\lambda$ in the BM wavelength $\lambda$ so that the bandwidth-tuned optical fiber has a target bandwidth greater than 2 GHz·km at a target wavelength within the BM wavelength range.

Another embodiment of the disclosure is directed to a method of forming a bandwidth-tuned optical fiber, comprising: a) for a test optical fiber supporting BM operation in a BM wavelength range comprising a plurality of BM wavelengths, establishing a correlation between a modal delay $\tau$, a draw tension T and a BM wavelength $\lambda$, the correlation comprising data measured for the test optical fiber; b) selecting a target draw tension $T_T$ for the bandwidth-tuned optical from the correlation, the target draw tension $T_T$ selected so that the bandwidth-tuned optical fiber has a target bandwidth $BW_T$ at a target BM wavelength $\lambda_T$ within the BM wavelength range; and c) drawing the bandwidth-tuned optical fiber at the target draw tension $T_T$.

Another embodiment of the disclosure is directed to a method of forming a bandwidth-tuned non-test optical fiber for short-length data transmission systems, comprising: a) establishing a relationship between a change $\Delta\tau$ in a modal delay $\tau$ and a change $\Delta T$ in a draw tension T for a BM target wavelength $\lambda_T$ of light in a BM wavelength range from 840 nm and 1100 nm for a test optical fiber that supports BM operation at the BM target wavelength $\lambda_T$; and drawing the bandwidth-tuned optical fiber by changing the amount of draw tension according to the relationship between the change $\Delta\tau$ in the modal delay and the change $\Delta T$ in the draw tension T so that the bandwidth-tuned optical fiber has a target bandwidth greater than 2 GHz·km at the target wavelength T.

Another embodiment of the disclosure is directed to a method of forming a bandwidth-tuned optical fiber, comprising: a) for a test optical fiber supporting BM operation in a BM wavelength range comprising a plurality of BM wavelengths, establishing a correlation between a modal delay $\tau$ and a draw tension T for a BM target wavelength $\lambda_T$, the correlation comprising data measured for the test optical fiber; b) selecting a target draw tension $T_T$ for the bandwidth-tuned optical from the correlation, the target draw tension $T_T$ selected so that the bandwidth-tuned optical fiber has a target bandwidth $BW_T$ at the BM target wavelength $\lambda_T$; and c) drawing the bandwidth-tuned optical fiber at the target draw tension $T_T$.

Another embodiment of the disclosure is directed to a method of forming a bandwidth-tuned optical fiber for short-length data transmission systems, comprising: a) establishing a relationship between a change $\Delta\lambda_p$ in a peak wavelength $\lambda_p$ of light that resides within a BM wavelength range from 840 nm and 1100 nm and a change $\Delta T$ in a draw tension T, for a test optical fiber that supports BM operation with the BM wavelength range; and b) drawing the bandwidth-tuned optical fiber with the draw tension T set according to the relationship between the change $\Delta\lambda_p$ in the peak wavelength $\lambda_p$ and the change $\Delta T$ in the draw tension T to cause the optical fiber to have a target peak wavelength $\lambda_{pT}$ at which the bandwidth-tuned optical fiber has a bandwidth of greater than 2 GHz·km.

Another embodiment of the disclosure is directed to a method of forming a bandwidth-tuned optical fiber, comprising: a) for a test optical fiber supporting BM operation in a BM wavelength range comprising a plurality of BM wavelengths, establishing a correlation between a peak wavelength $\lambda_p$ and a draw tension T, the correlation comprising data measured for the test optical fiber; b) selecting a target draw tension $T_T$ for the bandwidth-tuned optical from the correlation, the target draw tension $T_T$ selected so that the bandwidth-tuned optical fiber has a target bandwidth $BW_T$ at the peak wavelength $\lambda_p$; and c) drawing the bandwidth-tuned optical fiber at the target draw tension $T_T$.

Another embodiment of the disclosure is directed to method of forming an optical fiber data transmission system comprising: forming an optical fiber link using the bandwidth-tuned optical fibers disclosed herein, wherein the optical fiber link has an input end, an output end and a link length LL between the input and output ends, wherein LL<1000 meters; optically coupling the input end of the optical fiber link to a SM VCSEL that emits light having a VCSEL wavelength $\lambda_V$ that is substantially equal to the target wavelength and that carries optical signals at a data rate of at least 10 Gb/s; and optically coupling a photodetector to the output end of the optical fiber link to receive and convert the optical signals to electrical signals.

Another embodiment of the disclosure is directed to a method of forming an optical fiber data transmission system comprising: forming an optical fiber link using the bandwidth-tuned optical fiber disclosure herein, wherein the optical fiber link has an input end, an output end and a link length LL between the input and output ends, wherein LL<1000 meters; optically coupling the input end of the optical fiber link to a SM VCSEL that emits light having first and second VCSEL wavelengths $\lambda_{V1}$ and $\lambda_{V2}$ that respectively carry first and second optical signals at a data rate of at least 10 Gb/s, and wherein the target wavelength is substantially midway between the first and second VCSEL wavelengths $\lambda_{V1}$ and $\lambda_{V2}$; and optically coupling first and second photodetectors to the output end of the optical fiber link to respectively receive and convert the first and second optical signals to electrical signals.

It is to be understood that both the foregoing general description and the following detailed description are merely exemplary and are intended to provide an overview or framework to understanding the nature and character of the claims. The accompanying drawings are included to provide a further understanding and are incorporated in and constitute a part of this specification. The drawings illustrate one or more embodiments, and together with the description explain the principles and operation of the various embodiments.

DETAILED DESCRIPTION

Figure 1:
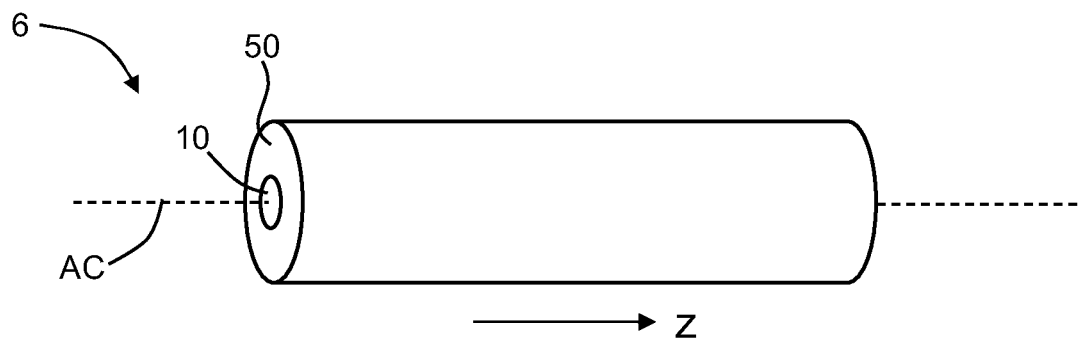
FIG. 1 is a schematic elevated view of an example optical fiber.

Reference is made in detail to example embodiments illustrated in the accompanying drawings. Whenever possible, the same reference numerals are used throughout the drawings to refer to the same or like parts.

The claims as set forth below are incorporated into and constitute part of this detailed description.

Cartesian coordinates are used in some of the Figures for the sake of reference and ease of illustration and are not intended to be limiting as to direction or orientation. The z-direction is taken as the axial direction of the optical fiber.

U.S. Pat. No. 10,131,566, entitled "Methods for modifying multi-mode optical fiber manufacturing processes," is incorporated by reference herein.

U.S. Patent Application Ser. No. 62/803,956, entitled "Optical fibers for single mode and few mode VCSEL-based optical fiber transmission systems," is incorporated by reference herein.

The coordinate r is a radial coordinate, where r=0 corresponds to the centerline of the fiber.

The symbol "µm" is used as shorthand for "micron," which is a micrometer, i.e., $1\times10^{-6}$ meter.

The symbol "nm" is used as shorthand for "nanometer," which is $1\times10^{-9}$ meter.

The term "fiber" as used herein is shorthand for optical fiber.

The term "single mode" is abbreviated as SM and when referring to an optical fiber means that the optical fiber supports a single linear polarization (LP) mode at an operating wavelength equal to or greater than the cut-off wavelength.

A standard SM optical fiber referred to herein and such as mentioned above has optical properties according to the G.652 industry standards known in the art and as set forth by Telecommunication Industry Association (TIA). A standard SM optical fiber has a relatively small core of about 9 microns in diameter and a numerical aperture (NA) of about 0.12. A standard single-mode fiber is designed to have a cable cut-off wavelength $\lambda_C$ below (i.e., less than) 1260 nm so the fiber supports only one mode at 1310 nm and supports a few modes at 850 nm. Typically, a standard SM fiber has a step index profile associated with a very high alpha parameter (e.g., $\alpha \geq 10$). The step index profile is simple, but the bandwidth at 850 nm is low. Consequently, a standard single-mode fiber with a step index is not suitable for few mode or bi-mode transmission at 850 nm.

The term "few mode" is abbreviated FM and when referring to an optical fiber means that the optical fiber supports two or three linear polarization (LP) modes, and typically refers to a single mode fiber operating below the cut-off wavelength (defined below). A given optical fiber can be both SM and FM since SM and FM operation is determined by the wavelength of light used.

The term "bi-mode" or "bi-modal" is abbreviated BM and when referring to an optical fiber means a special case of an FM optical fiber that supports only two modes, e.g., $LP_{01}$ and $LP_{11}$ modes. The optical fiber 6 discussed below is designed for BM operation (and is thus referred to as a BM fiber) in a BM (bimodal) wavelength range from 840 nm to 1100 nm, where BM wavelength range refers to a range of operating wavelengths over which the optical fiber supports only two modes.

The term "bandwidth tuning" is used herein to describe the process of forming the BM fiber to have a select bandwidth performance ("target bandwidth" $BW_T$) at a select or target wavelength $\lambda_T$ within the BM wavelength range between 840 nm and 1100 nm. In an example, the bandwidth-tuned BM fiber has a select or "target" bandwidth $BW_T$, which in an example is in the range from 1 GHz·km to 50 GHz·km or above. A wavelength within the BM wavelength range is referred to as a bimodal or BM wavelength and is denoted $\lambda$. The target wavelength is an example of a BM wavelength $\lambda$.

The limits on any ranges cited herein are inclusive and thus lie within the range, unless otherwise specified.

The terms "comprising," and "comprises," e.g., "A comprises B," is intended to include as a special case the concept of "consisting," as in "A consists of B."

Some non-italicized parameters and variables are shown in italics in the equations set forth below by way of equation conventions used in the art.

The terms "drawing tension" and "draw tension" or just "tension" are used interchangeably herein and are denoted by T and have units of grams, g. However, it should be understood that drawing tension measurements provided in grams may be converted to tension measurements in Newtons or dynes. To convert grams of drawing tension to Newtons of drawing tension, the drawing tension in grams is multiplied by 0.0098. To convert grams of drawing tension to dynes of drawing tension, the drawing tension in grams is multiplied by 980.

The phrase "bare optical fiber" or "bare fiber" as used herein means an optical fiber directly drawn from a heated glass source (i.e., a "preform") and prior to applying a protective coating layer to its outer surface (e.g., prior to the bare optical fiber being coated with a polymeric-based material). In the discussion below, the term "fiber" can mean a bare optical fiber or a coated optical fiber unless expressly stated otherwise.

The "relative refractive index" as used herein is defined as:

$$\Delta \% = 100 \frac{n^2(r) - n_{cl}^2}{2n^2(r)}$$

where n(r) is the refractive index of the fiber at the radial distance r from the fiber's centerline AC (r=0) at a wavelength of 1550 nm, unless otherwise specified, and $n_{cl}$ is the index of the outer cladding at a wavelength of 1550 nm. When the outer cladding is essentially pure silica, $n_{cl}$=1.444 at a wavelength of 1550 nm. As used herein, the relative refractive index percent (also referred herein as the "relative refractive index" or "relative index percent" for short) is represented by $\Delta$ (or "delta"), $\Delta\%$ (or "delta %"), or %, all of which can be used interchangeably, and its values are given in units of percent or %, unless otherwise specified. Relative refractive index is also expressed as $\Delta(r)$ or $\Delta(r)\%$. Relative refractive index is also defined for specific regions "i" of a fiber, where the regions "i" include in one example a core (i=1), inner cladding (i=2), trench (i=3), and/or outer cladding (i=4), or in another example a core (i=1), a trench (i=2), and a cladding (i=4), or in yet another example a core (i=1), and a cladding (i=4). The relative refractive index of region "i" is expressed as $\Delta_i$, where, unless otherwise specified, $\Delta_i$ refers to the average value of $\Delta$ in region "i". The minimum and maximum values of $\Delta$ in region "i" are expressed as $\Delta_{i,min}$ and $\Delta_{i,max}$, respectively.

In cases where the refractive index of a region is less than the reference index $n_{cl}$, the relative index percent is negative and is referred to as having a depressed region or depressed-index (also referred to as a "trench"), and the minimum relative refractive index is calculated at the point at which the relative index is most negative unless otherwise specified. In cases where the refractive index of a region is greater than the reference index $n_{cl}$, the relative index percent is positive and the region can be said to be raised or to have a positive index.

The term "dopant" as used herein refers to a substance that changes the relative refractive index of glass relative to pure undoped $SiO_2$. One or more other substances that are not dopants may be present in a region of an optical fiber (e.g., the core) having a positive relative refractive index $\Delta$. The dopants used to form the core of the optical fiber disclosed herein include $GeO_2$ (germania) and $Al_2O_3$ (alumina). The parameter a (also called the "profile parameter" or "alpha parameter") as used herein relates to the relative refractive $\Delta(\%)$ where r is the radius (radial coordinate), and which is defined by:

$$\Delta(r) = \Delta_0 \{ 1 - [(r-r_m)/(r_0-r_m)]^\alpha \}$$

where $r_m$ is the point where $\Delta(r)$ is the maximum $\Delta_0$, $r_0$ is the point at which $\Delta(r)=0$ and r is in the range $r_{initial}$ to $r_{final}$, where $\Delta(r)$ is defined above, $r_{initial}$ is the initial point of the $\alpha$-profile, $r_{final}$ is the final point of the $\alpha$-profile and $\alpha$ is an exponent that is a real number. For a step index profile, $\alpha>10$, and for a gradient-index profile, $\alpha<5$.

The "trench volume" is denoted by V and is defined for a trench with a relative refractive index $\Delta_T$ as a constant:

$$V = \Delta_T \cdot [(r_{OUT})^2 - (r_{IN})^2].$$

where $r_{OUT}$ and $r_{IN}$ are the outer and inner radii that define the trench. In an example where the trench relative refractive index $\Delta_T$ varies with radial coordinate (i.e., $\Delta_T(r)$), then the trench volume is given by $$V = 2\int \Delta_T(r) r \, dr$$

with the limits on the integration being from $r_{IN}$ to $r_{OUT}$ and the units in "%-μm²".

Figure 3A:
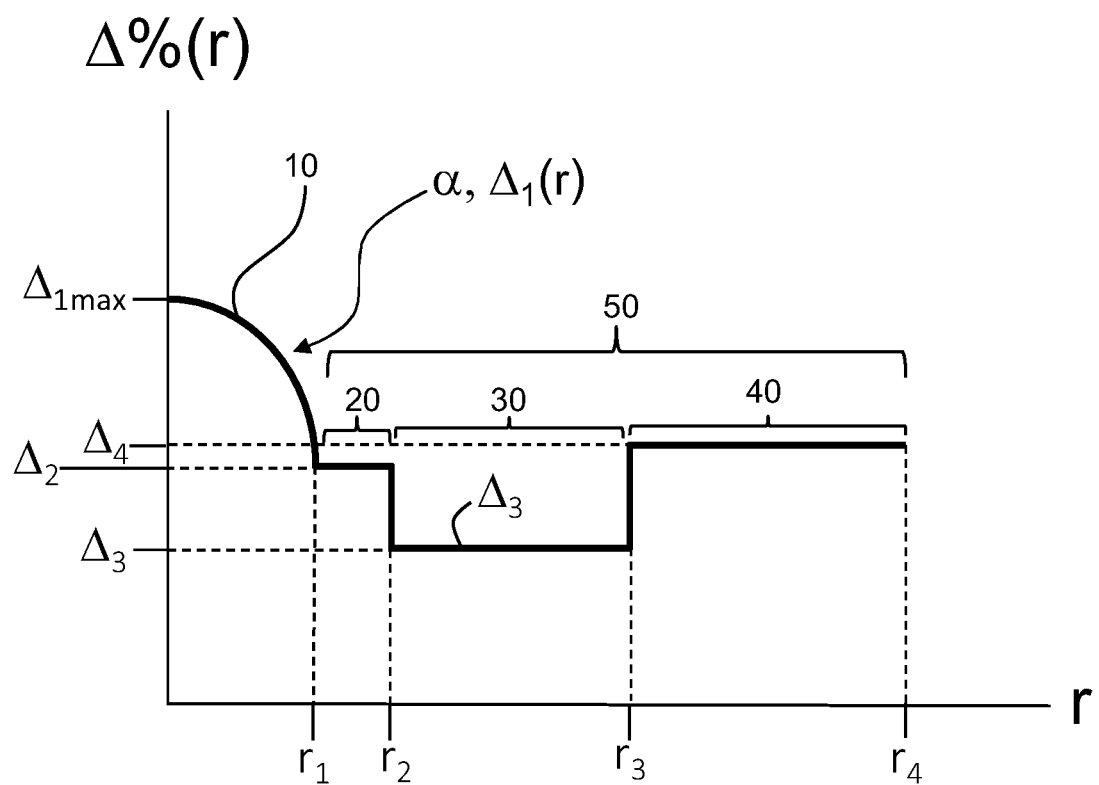
FIGS. 3A through 3D are example refractive index profile plots that plot the relative refractive index $\Delta\%$ (r) versus the radial coordinate r (µm) for the example optical fiber configurations, with FIG. 3C being a specific example refractive index profile for the optical fiber configuration of FIG. 2B.

Thus, for the example refractive index profile shown in FIG. 3A, $\Delta_T = \Delta_3$, with $r_{OUT} = r_3$ and $r_{IN} = r_2$, so that $$V = \Delta_3 \cdot [(r_3)^2 - (r_2)^2].$$

Figure 3B:
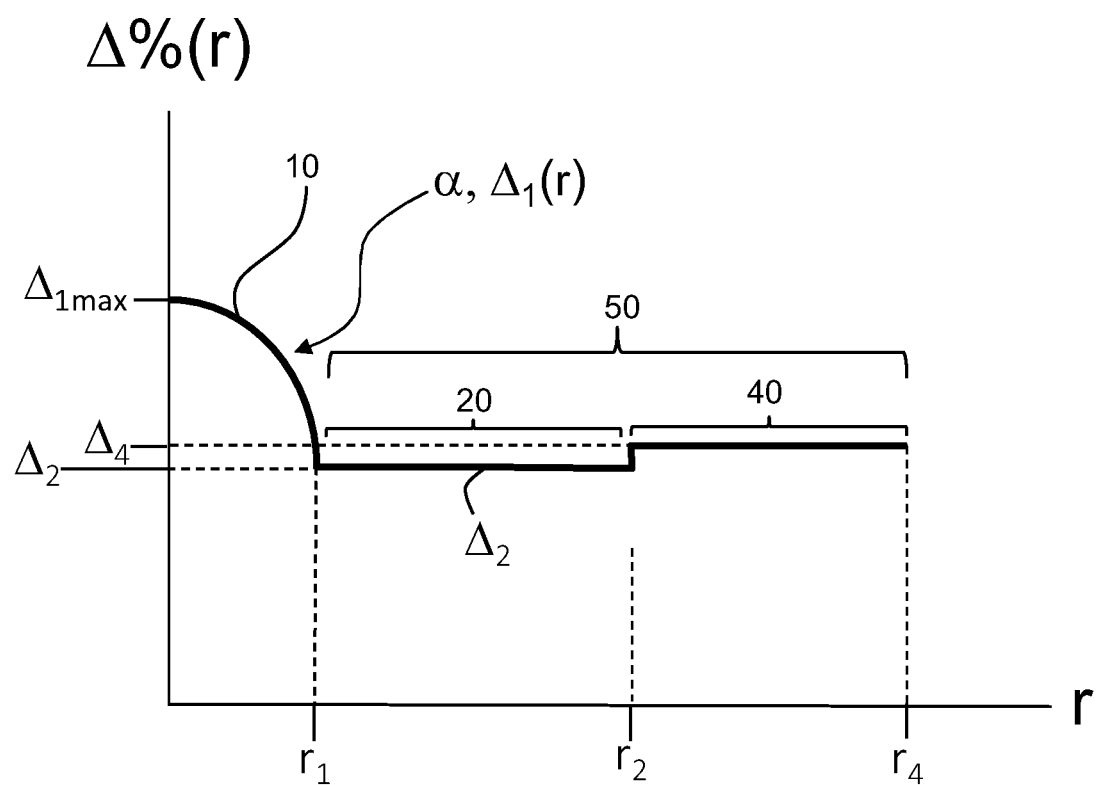

And in an example where the relative refractive index $\Delta_3$ varies with radial coordinate (i.e., $\Delta_3(r)$), then the trench volume is given by $$V = 2\int \Delta_3(r) r \, dr$$

with the limits on the integration being from $r_2$ to $r_3$ and the units in "%-μm²". The trench 20 in the example refractive index profile of FIG. 3B is calculated in an analogous manner.

The "mode field diameter" or "MFD" of an optical fiber is determined using the Peterman II method, which is the current international standard measurement technique for measuring the MFD of an optical fiber. The MFD is given by:

$$MFD = 2w$$

$$w = \left[ 2 \frac{\int_0^\infty (f(r))^2 r \, dr}{\int_0^\infty \left(\frac{df(r)}{dr}\right)^2 r \, dr} \right]^{1/2}$$

where f(r) is the transverse component of the electric field distribution of the guided optical signal and r is radial position in the fiber. The MFD depends on the wavelength of the optical signal and is reported herein at selected wavelengths as indicated below.

A related concept to MFD is the "effective area" of an optical fiber, which is defined as: $A_{eff} = 2\pi (\int (f(r))^2 r \, dr)^2 / (\int (f(r))^4 r \, dr)$, where r is the radial coordinate, the integration limits are 0 to ∞, and f(r) is the transverse component of the electric field associated with light propagated in the optical fiber. Effective area depends on the wavelength of the optical signal and is reported herein at selected wavelengths as indicated below.

"Chromatic dispersion", herein referred to as "dispersion" unless otherwise noted, of an optical fiber is the sum of the material dispersion, the waveguide dispersion, and the inter-modal dispersion. In the case of single mode waveguide fibers, the inter-modal dispersion is zero. Dispersion values in a two-mode regime assume intermodal dispersion is zero. Dispersion is reported herein in units of ps/nm-km.

The zero-dispersion wavelength is denoted $\lambda_0$ and is the wavelength where material dispersion and waveguide dispersion cancel each other. In silica-based optical fibers, the zero-dispersion wavelength is about 1300 nm, e.g., between 1300 and 1324 nm, depending on the dopants used to form the optical fiber.

The operating wavelength is denoted by $\lambda$ and is a wavelength at which the optical fiber can operate while supporting (guiding) a single mode, two modes, or a few modes. An operating wavelength at which the optical fiber supports only two modes is referred to as a BM wavelength.

The VCSEL wavelength is denoted $\lambda_V$ and represents one or more output wavelengths of a VCSEL. Example VCSEL wavelengths $\lambda_V$ can include one wavelength $\lambda_V = 850$ nm or two wavelengths $\lambda_{V1} = 850$ nm and $\lambda_{V2} = 910$ nm for two-wavelength VCSEL output.

The term "bandwidth" as used herein and denoted BW and is measured in units of MHz·km or GHz·km. For the bandwidth measurement, the two propagating modes in the BM fiber (e.g., $LP_{01}$ and $LP_{11}$) are excited with comparable weights, which is essentially the overfilled bandwidth. The bandwidth BW of a BM fiber is defined by the modal delay τ between the two propagating modes when the two modes are equally excited and is related to the modal delay τ in one embodiment via the equation:

$$BW(\tau) = b \cdot (1/\tau) = (1/3) \cdot (1/\tau)$$

and is hereinafter referred to as the "bandwidth equation" where b is a constant coefficient. In some other embodiments, the coefficient b in the bandwidth equation can be larger than 1/3. The values for the bandwidths BW referred to herein are based on the above equation with the coefficient b of (1/3) unless otherwise noted. A value of b=1/3 provides conservative or "worst case" value for calculating the bandwidth from the modal delay.

The target bandwidth $BW_T$ is a select bandwidth associated with a target wavelength $\lambda_T$ (see below).

The target wavelength is denoted $\lambda_T$ and is a wavelength in the BM wavelength range from 840 nm to 1100 nm associated with the target bandwidth $BW_T$. It is noted that the target wavelength $\lambda_T$ need not be equal to a VCSEL wavelength $\lambda_V$. In an example, the target wavelength $\lambda_T$ can be substantially the same as a VCSEL wavelength $\lambda_V$ of light emitted by the VCSEL, while in another example can reside between (e.g., substantially midway between) two VCSEL wavelengths $\lambda_{V1}$ and $\lambda_{V2}$ of light emitted by the VSCEL.

The term "peak wavelength" $\lambda_p$ means a wavelength of light that maximizes the bandwidth of the BM fiber formed using the methods disclosed herein. Techniques for measuring the peak wavelength of the BM fiber based on multi-wavelength measurement techniques and differential mode delay techniques are known in the art and are described for example in the aforementioned U.S. Pat. No. 10,131,566. The BM fibers formed using the tension-based bandwidth-tuning methods disclosed herein can have a target peak wavelength $\lambda_{pT}$ between 840 nm and 1100 nm.

A target draw tension $T_T$ is a draw tension used to establish a target peak wavelength $\lambda_{pT}$ or a target bandwidth $BW_T$ at a target wavelength $\lambda_T$.

The cut-off wavelength is denoted $\lambda_C$ and is the minimum wavelength at which the optical fiber will support only one propagating mode. For wavelengths below (less than) the cut-off wavelength $\lambda_C$, multimode (or few mode or bimodal) transmission may occur and an additional source of modal dispersion may arise to limit the fiber's bandwidth. Thus, the SM operating wavelength $\lambda$ has a lower limit of $\lambda_C$. The cut-off wavelength $\lambda_C$ is reported herein as a cable cut-off wavelength. The cable cut-off wavelength is based on a 22-meter cabled fiber length. The 22-meter cable cut-off wavelength is typically less than the 2-meter cut-off wavelength due to higher levels of bending and mechanical pressure in the cable environment. The cable cut-off wavelength $\lambda_C$ is equal to or below 1300 nm or equal to or below 1260 nm, and further in an example is in the wavelength range from 1160 nm to 1260 nm or in the range from 1160 nm to 1300 nm. Wavelengths at or above the cut-off wavelength $\lambda_C$ reside in what is referred to herein as the single mode or SM wavelength range of operation of the optical fiber.

As used herein, the term "modal delay" (also called differential mode delay) is denoted T and is the relative delay measured between the two guided modes of the BM fiber. A detailed testing procedure for measuring the mode delay is defined in TIA-455-220-A: FOTP-220 Differential Mode Delay Measurement of Multimode Fiber in the Time Domain.

Optical Fiber Configurations and Characteristics

The BM fiber 6 can have a number of different physical configurations as set forth below that provide it with desired the optical characteristics for use with SM or FM VCSELs. In an example, the physical configuration of the fiber 6 defines a cut-off wavelength $\lambda_C$ below 1260 nm and an MFD in the range from 8.2 µm≤MFD≤11 µm at a wavelength $\lambda$ of 1310 nm. This ensures that the fiber 6 is SM at a wavelength $\lambda$ above 1260 nm and is compatible with the standard SM fiber for splicing and connectorization. The fiber 6 also has a bandwidth of at least 1 GHz·km or at least 2 GHz·km or at least 4 GHz·km or in the range from 1 GHz·km to 50 GHz·km for at least one wavelength in the BM wavelength range from 840 nm and 1100 nm, where the fiber operates as an BM fiber. More specifically, the fiber 6 is formed using the tension-based bandwidth-tuning methods disclosed herein to have a target bandwidth $BW_T$ at a select or target wavelength $\lambda_T$ in the BM wavelength range from 840 nm and 1100 nm.

Figure 2A:
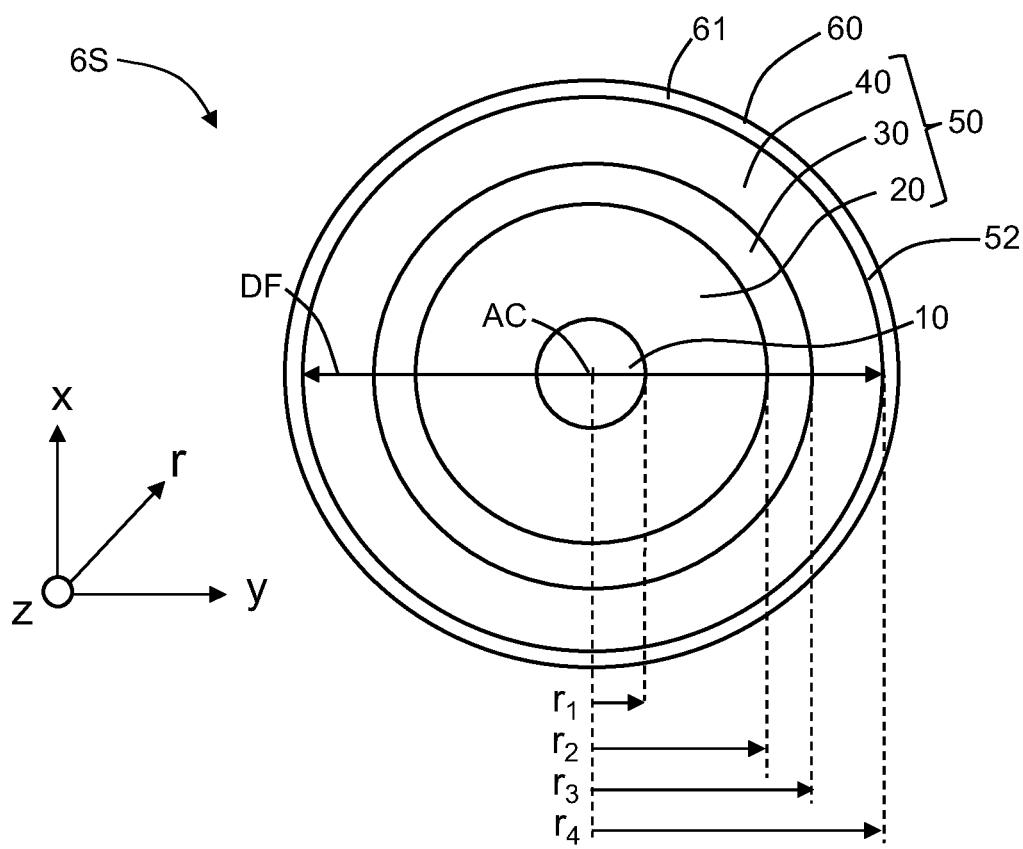
FIGS. 2A through 2C are schematic cross-sectional views of example configurations of the optical fiber of FIG. 1.
Figure 2B:
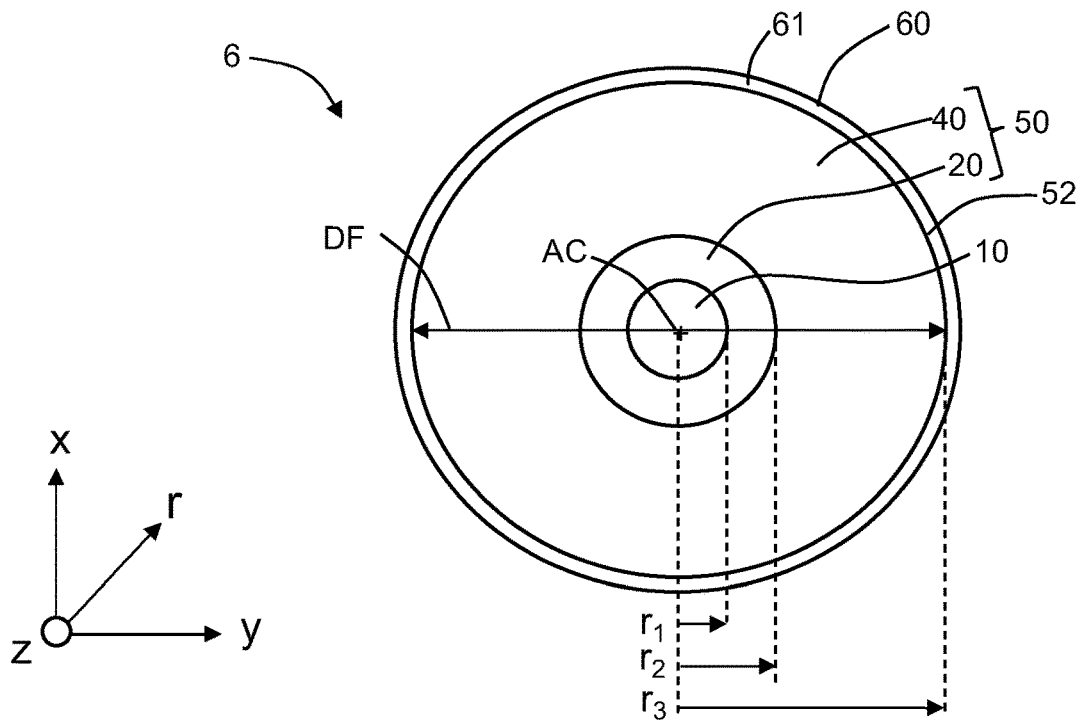
Figure 2C:
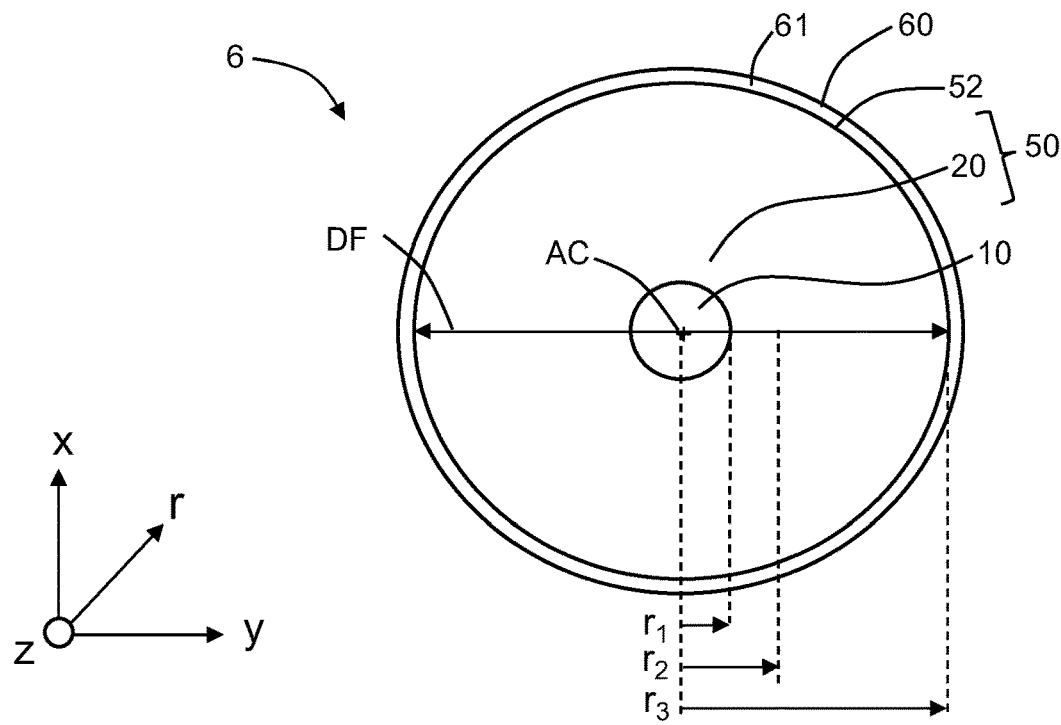

FIG. 1 is a schematic elevated view of a section of an example BM fiber ("fiber") 6 formed using the methods disclosed herein. FIGS. 2A through 2C are x-y cross-sectional view of the fiber 6. FIGS. 3A through 3D are example refractive index profiles of the fiber 6 in the form of a plot of the relative refractive index Δ% (r) versus the radial coordinate r. The fiber 6 operates as an SM fiber above a cut-off wavelength $\lambda_C$ of 1260 nm and is configured to have a low bending loss and operates as a BM fiber in the BM wavelength range from 840 nm to 1100 nm. The discussion herein emphasizes the BM operation of the fiber 6.

The fiber 6 has a centerline AC shown by way of example as running in the z-direction. The fiber 6 comprises a glass core region ("core") 10 that is centered on the centerline AC and that has a radial extent $r_1$ and a gradient relative refractive index $\Delta_1(r)$ with a maximum value $\Delta_1(r)=\Delta_{1max}$ on the centerline AC (i.e., at r=0) and decreasing to $\Delta_1(r)=0$ at r=$r_1$. The core 10 has a graded index as defined by an alpha value α in the range from 2≤α≤3.

The core 10 is immediately surrounded by a glass cladding region ("cladding") 50 that extends from the core radius ri out to a cladding outer radius $r_4$. The cladding 50 has an outer surface 52, which constitutes the outer surface of a bare fiber 6. In an example, the fiber 6 includes a protective coating 60 applied to the cladding outer surface 52. In an example, the protective coating 60 is made of a non-glass material 61, such as a polymeric material. When the fiber 6 includes the protective coating 60, it is referred to as a coated fiber.

In the example fiber 6 shown in FIG. 2A and FIG. 3A, the cladding 50 includes an inner cladding region ("inner cladding") 20 closest to the core 10 and extending from the core radius $r_1$ to a radius $r_2$ and having a relative refractive index $\Delta_2 < \Delta_1$; an intermediate cladding region or "trench" 30 immediately adjacent the inner cladding 20 and extending from the radius $r_2$ to a radius $r_3$ and having a relative refractive index $\Delta_3 \leq \Delta_2$; and an outer cladding region ("outer cladding") 40 immediately adjacent the trench 30 and extending from the radius $r_3$ to the outer cladding radius $r_4$ and having a relative refractive index $\Delta_4$, wherein $\Delta_3 \leq \Delta_4$.

Figure 3C:
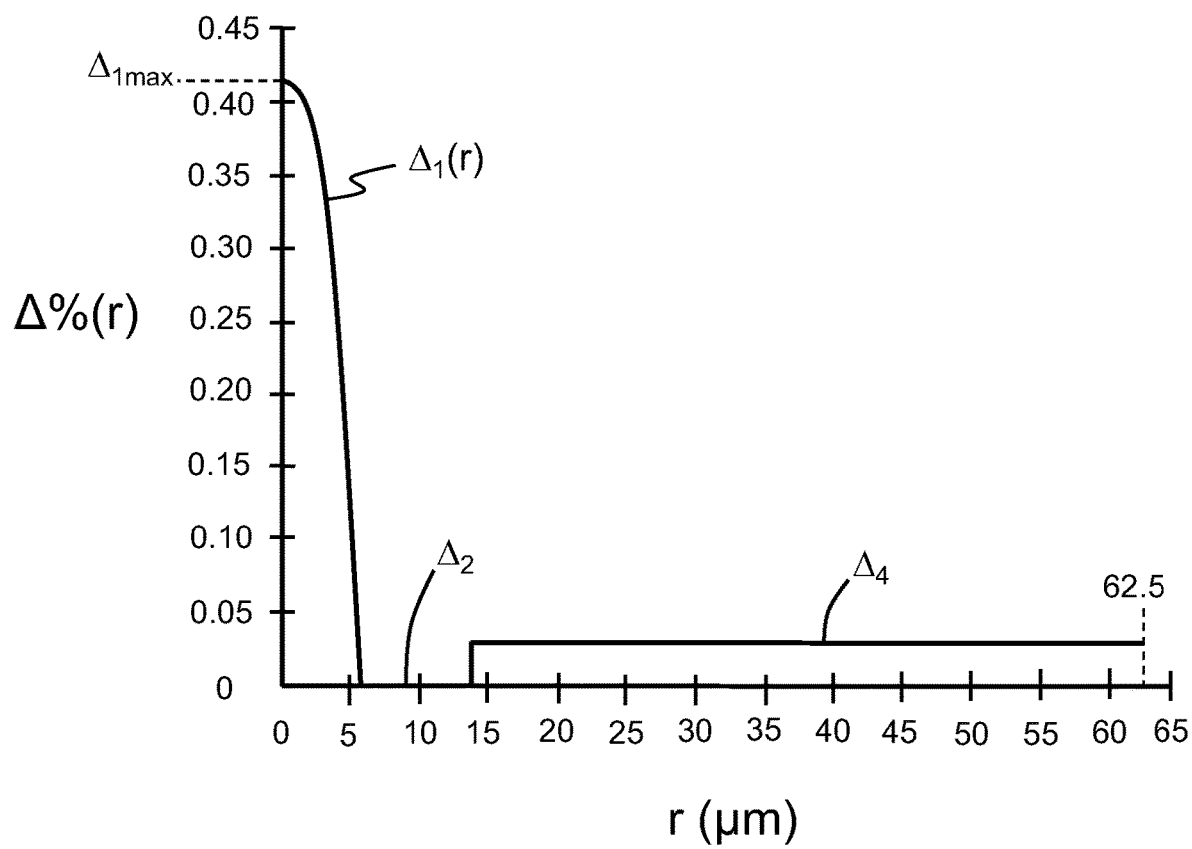

In the example shown in FIG. 2B and FIGS. 3B and 3C, the cladding 50 includes an inner cladding region ("inner cladding") 20 closest to the core and extending from the core radius $r_1$ to a radius $r_2$ and having a relative refractive index $\Delta_2=\Delta_1(r_1)=0$ and an outer cladding 40 immediately adjacent the inner cladding 20 and extending from the radius $r_2$ to a radius $r_4$. The outer cladding 40 has a relative refractive index $\Delta_4 > \Delta_2$, which makes the inner cladding 20 a "trench."

Figure 3D:
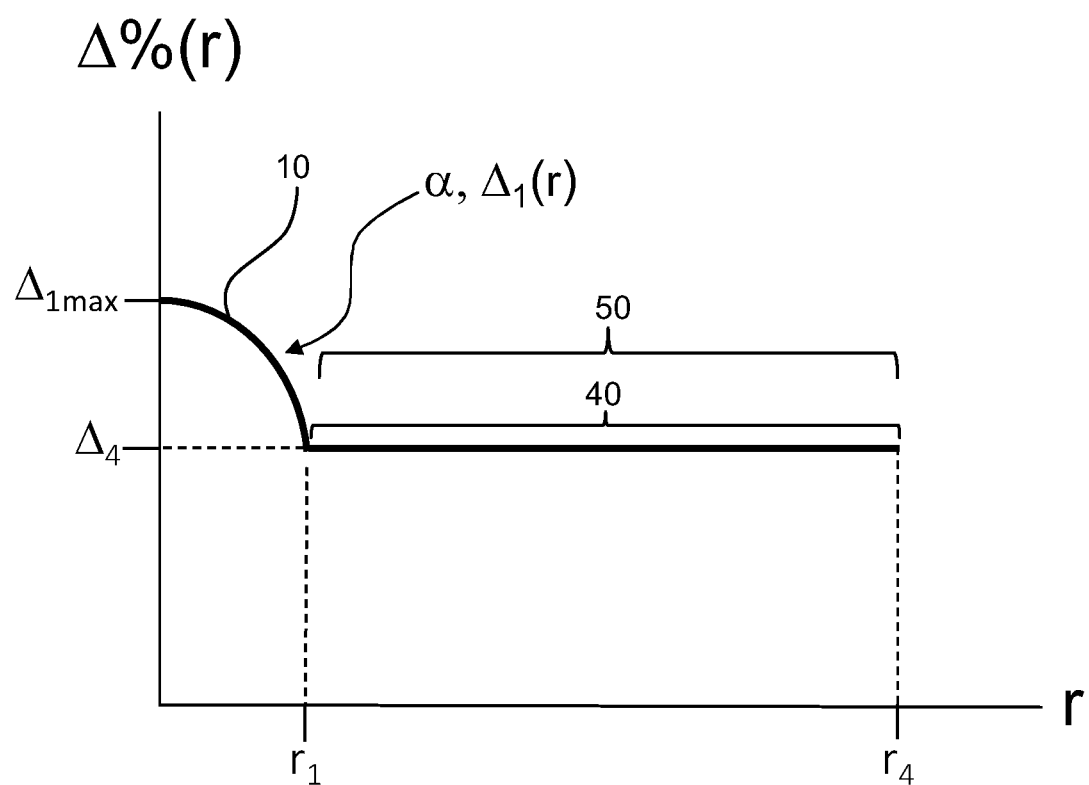

The example shown in FIG. 2C and FIG. 3D, the cladding 50 includes a single cladding region 40.

Fiber Drawing System

Aspects of the disclosure are directed to methods that involve adjusting the tension on the fiber 6 during the drawing process to a target tension $T_T$ to "tune" the fiber to have an optimal (maximum) or higher bandwidth $BW_T$ at a target wavelength $\lambda_T$ in the BM range from 840 nm and 1100 nm.

Figure 4A:
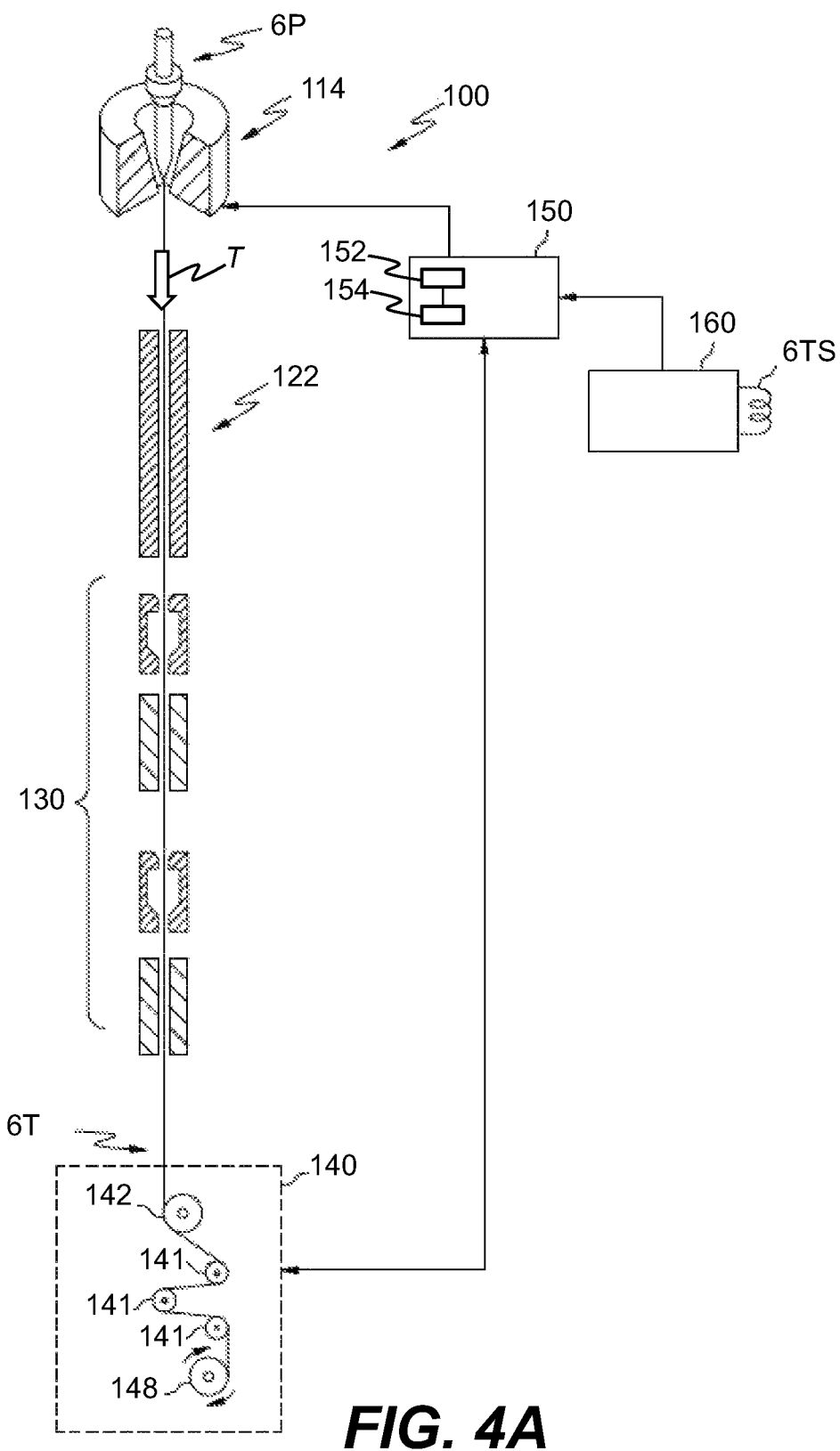
FIGS. 4A and 4B are schematic diagrams of an example fiber drawing system as used herein, with FIG. 4A showing the fabrication of a test optical fiber and FIG. 4B showing the fabrication of a non-test optical fiber, with each optical fiber formed using the tension-based bandwidth-tuning methods disclosed herein.
Figure 4B:
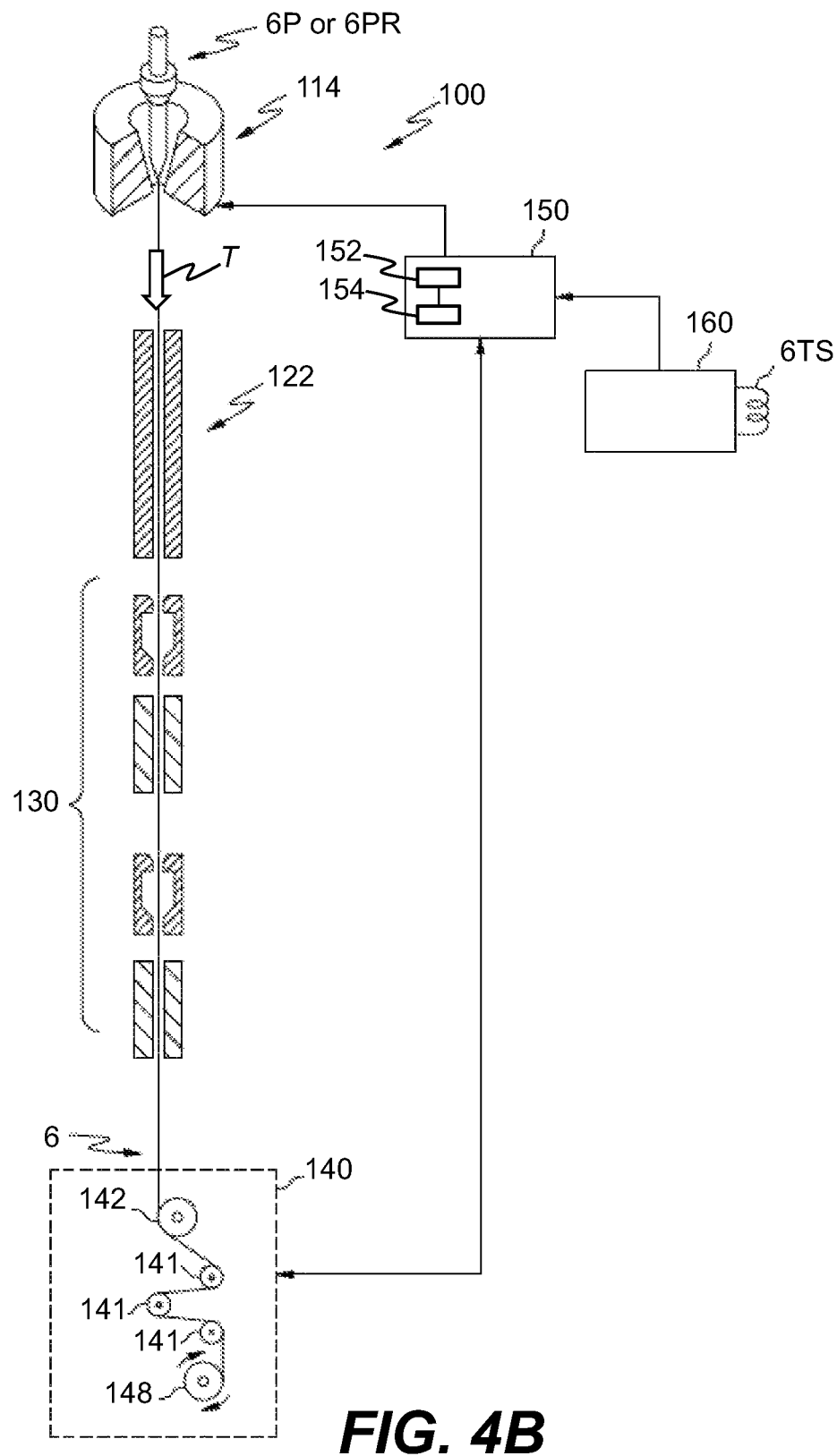

FIGS. 4A and 4B are schematic diagrams of an example optical fiber drawing system ("drawing system") 100 for drawing the fiber 6 (or a test fiber 6T, explained below) from a fiber preform 6P. The drawing system 100 includes a peak wavelength determination system 160, which is operable to determine (measure) a measured peak wavelength $\lambda_p$ of a test fiber 6T operably disposed in the peak wavelength determination system 160. The measured peak wavelength $\lambda_p$ as determined by the peak wavelength determination system 160 may be used to modify the process for manufacturing the fiber 6 by the drawing system 100 to enhance the BW performance characteristics of the drawn fiber 6, as described in detail below, and in an example to achieve a target peak wavelength $\lambda_{pT}$.

The fiber preform 6P generally comprises silica-based glass. In embodiments in which the fiber preform 6P comprises silica-based glass, the fiber preform 6P may include dopants that increase or decrease the refractive index of the silica-based glass relative to pure silica glass. In some embodiments, the fiber preform 6P comprises a core surrounded by cladding in a scale-up configuration of the fiber 6 as shown in FIG. 1. In some embodiments, the fiber preform 6P comprises a doped or undoped glass core surrounded by a layer of doped or undoped glass. In some embodiments, the fiber preform 6P may be a core blank. In other embodiments, the fiber preform 6P may be a cane formed from a core blank, such as in embodiments in which the fiber preform 6P is one of a plurality of canes formed from a single core blank.

In the embodiment depicted in FIGS. 4A and 4B, the drawing system 100 generally comprises a draw furnace 114, a fiber cooling system 122, a coating system 130, a fiber take-up system 140, and a process controller 150.

The draw furnace 114 includes a heating element (not shown) that supplies heat to at least a bottom portion of the fiber preform 6P. In some embodiments, the draw furnace 114 may heat the bottom portion of the fiber preform 6P to a draw temperature of about 1700° C. to about 2100° C.

The fiber 6 (or test fiber 6T) is drawn from the heated fiber preform 6P and through the various stages of the drawing system 100 and collected with the fiber take-up system 140. The fiber take-up system 140 utilizes various drawing mechanisms 142 and pulleys 141 to provide a desired amount of tension Tin the axial direction of the fiber 6 as the fiber 6 is drawn through the drawing system 100.

In the embodiment of the drawing system 100 depicted in FIGS. 4 and 4B, the fiber 6 or test fiber 6T is drawn from the fiber preform 6P with the fiber take-up system 140 and exits the draw furnace 114 along a substantially vertical pathway. As the fiber 6 or test fiber 6T is drawn along the vertical pathway, the fiber may optionally be drawn through the fiber cooling system 122, which cools the fiber 6 or test fiber 6T prior to the application of one or more coatings. The fiber cooling system 122 is generally spaced apart from the draw furnace 114 such that the fiber 6 or test fiber 6T cools to temperatures significantly below the draw temperature before entering the fiber cooling system 122. For example, the spacing between the draw furnace 114 and the fiber cooling system 122 may be sufficient to cool the fiber 6 or test fiber 6T from the draw temperature. While the fiber cooling system 122 has been described herein as part of the drawing system 100 for producing a fiber 6 or test fiber 6T, it should be understood that the fiber cooling system 122 is optional and that, in other embodiments, the particular fiber may be drawn directly from the draw furnace 114 to a coating system 130 without entering the fiber cooling system 122.

Still referring to FIGS. 4A and 4B, after the fiber 6 or test fiber 6T exits the fiber cooling system 122, it enters the coating system 130, where one or more coating layers are applied to the outer surface 52 of the cladding 50 of the fiber. In one embodiment described herein, the coating system 130 applies at least one polymeric coating layer 60 (see FIGS. 2A through 2C).

The process controller 150 may include a processor 152 communicatively coupled to a memory 154. The memory 154 can contain a (non-transitory) computer readable medium and computer readable and executable instructions, which are executed by the processor to control the process for manufacturing fiber 6 in the manner disclosed herein. In some embodiments, the computer readable and executable instructions are executed by the processor 152 to adjust the tension T to modify the process for manufacturing the fiber 6, as described in further detail below.

In the embodiment depicted in FIGS. 4A and 4B, the process controller 150 is communicatively coupled to the draw furnace 114 and the fiber take-up system 140 and may modify the process for manufacturing the fiber 6 as described herein by modifying a temperature of the draw furnace 114 and/or modifying the tension T applied by the fiber take-up system 140, such as by adjusting a drawing speed of the fiber take-up system 140. In some embodiments, the process controller 150 may only be communicatively coupled to one of the draw furnace 114 and the fiber take-up system 140, such as in embodiments in which the process for manufacturing multi-mode optical fiber is adjusted by modifying only one of the temperature of the draw furnace 114 and the tension T applied by the fiber take-up system 140.

As noted hereinabove, the peak wavelength determination system 160 determines a measured peak wavelength $\lambda_p$ of a test fiber 6T as shown in FIG. 4A. The peak wavelength determination system 160 may include a processor communicatively coupled to a memory. The memory contains computer readable and executable instructions which are executed by the processor to determine the measured peak wavelength of the test fiber 6T based on at least one measured characteristic of the test fiber, as described below.

In some embodiments, such as the embodiment depicted in FIG. 4A, the test fiber 6T may be provided for use in the peak wavelength determination system 160 by separating one or more fiber test segments 6TS from the drawn test fiber 6T. Each fiber test segment 6TS may then be coupled to the peak wavelength determination system 160 (e.g., via mechanical splicing or fusion splicing) so that the measured peak wavelength of the given fiber test segment 6ST may be determined. In some embodiments, the fiber test segments 6TS may be transferred to a spool before coupling the test segment to the peak wavelength determination system 160. The fiber test segment 6TS may be obtained at the initiation of the drawing process. In some embodiments, multiple fiber test segments 6TS may be separated and coupled to the peak wavelength determination system 160, such as in embodiments in which the test fiber 6 is drawn during a single process run and wound to multiple spools (e.g., using an indexing winder) and a fiber test segment 6TS is separated during a spool change. Furthermore, a fiber test segment 6TS may be separated and coupled to the peak wavelength determination system 160 at predefined intervals, such as once per 20 km, once per 30 km, once per 50 km, or at any other interval.

In other embodiments, the peak wavelength determination system 160 may determine the measured peak wavelength $\lambda_p$ of the drawn test fiber 6T before the test fiber is separated from the fiber perform 6P. For example, in some embodiments, the peak wavelength determination system 160 may determine the measured peak wavelength $\lambda_p$ of the drawn test fiber 6T via an online peak wavelength measurement system that measures the peak wavelength of the drawn test fiber 6T in real time as the test fiber is drawn. Such an online measurement system allows the peak wavelength $\lambda_p$ of the drawn test fiber 6T to be measured and process parameters to be adjusted in substantially real time.

With continuing reference to FIG. 4A, the peak wavelength determination system 160 is communicatively coupled to the process controller 150. However, in some embodiments, the peak wavelength determination system 160 may not be communicatively coupled to the process controller 150, such as in embodiments in which the peak wavelength determination system 160 is separate from the drawing system 100, but at least one parameter of the drawing system 100 is modified or adjusted based on the peak wavelength of the test fiber 6T as determined by the peak wavelength determination system 160. The peak wavelength information obtained from the fiber in early portion of a preform can be used as the feedback for later portion of the preform. Since in some cases, the same core blank or core cane which essentially represents the core portion of the fiber can be made into several preforms with very similar refractive index profiles, the peak wavelength information obtained from one preform can be used as feedback for its sister preform to get optimum fiber for the fibers drawn from the sister preforms.

In some examples, the relative refractive index profile Δ(r) of a sample fiber 6TS is obtained using measurement techniques known in the art. Such a measurement requires only a small length of the sample fiber 6TS, e.g., 10 cm. The optical properties of the drawn fiber 6 are then deduced from the measured relative refractive index profile Δ(r) using methods known in the art.

Forming the BM Fiber

Aspects of the disclosure are directed to using the drawing system 100 of FIGS. 4A and 4B to form a (non-test) bandwidth-tuned fiber 6 having a refractive index profile such as the ones shown in FIGS. 3A through 3D so that the fiber is SM above a cut-off wavelength $\lambda_C$ of 1260 nm and has an SM operating window from 1260 nm to 1650 nm and is BM in the wavelength range from 840 nm to 1100 nm, with a bandwidth for at least one wavelength in the BM wavelength range of at least 1 GHz·km, in some cases at least 2 GHz·km and in some other cases, at least 4 GHz·km. In an example, the at least one wavelength comprises a target wavelength $\lambda_T$ as discussed above.

Experiments were conducted wherein 1 km lengths of example test fibers 6T having the refractive index profile of FIGS. 3B and 3C were formed using the drawing system 100 with different tensions T, namely 30 g, 60 g, 90 g and 120 g. The example test fibers 6T are described below in connection with FIG. 8 and their various optical properties are set forth in Tables 2 and 3. The modal delay τ (ns/km) for each example test fiber 6T was measured at wavelengths λ of 820 nm, 850 nm and 880 nm. It is known in the art that the bandwidth BW can be determined from the modal delay τ. The results are summarized in Table 1A below. The corresponding bandwidth values BW according to the equation BW(τ)=(1/3)·(1/τ) for the modal delays in Table 1A are set forth in Table 1B.

TABLE 1A

| Tension T (g) | τ (ns/km) @ 820 nm | τ (ns/km) @ 850 nm | τ (ns/km) @ 880 nm |
|---|---|---|---|
| 30 | 0.2747 | 0.4216 | 0.592 |
| 60 | 0.1801 | 0.3149 | 0.4716 |
| 90 | 0.08728 | 0.2119 | 0.3563 |
| 120 | 0.02116 | 0.1371 | 0.2740 |

TABLE 1B

| Tension T (g) | BW @ 820 nm (GHz · km) | BW @ 850 nm (GHz · km) | BW @ 880 nm (GHz · km) |
|---|---|---|---|
| 30 | 1.213 | 0.791 | 0.563 |
| 60 | 1.851 | 1.058 | 0.707 |
| 90 | 3.820 | 1.572 | 0.935 |
| 120 | 15.385 | 2.431 | 1.217 |

Figure 5:
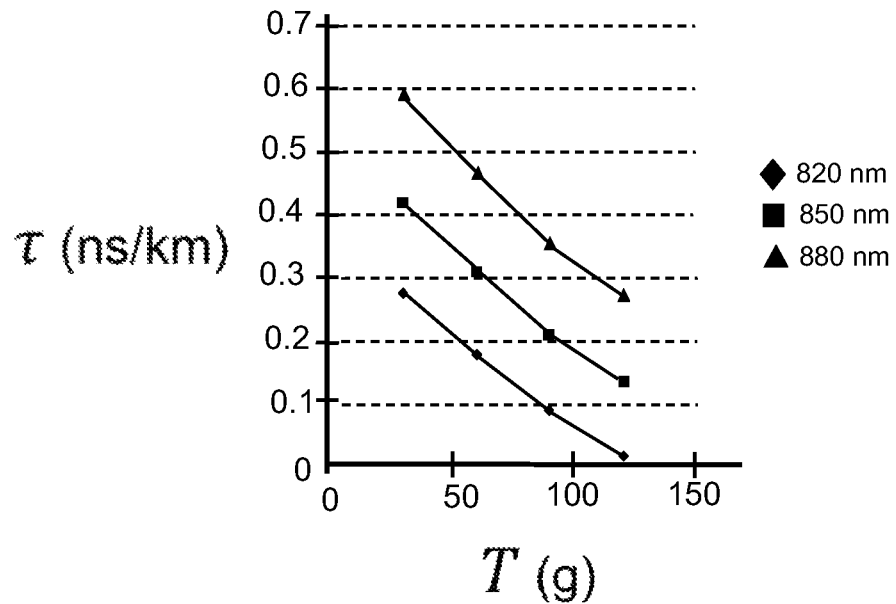
FIG. 5 is a plot of the modal delay $\tau$ (ns/km) as a function of the draw tension T (g) for measurements made on example test optical fibers as set forth in Table 1A, below.

FIG. 5 is a plot of the modal delay τ (ns/km) as a function of the draw tension T (g) for the data of Table 1A. For each wavelength, the curve follows a similar slope and the data provides a correlation between the modal delay τ and the draw tension T. The data for 850 nm can be used to quantify the correlation. In an example, this is accomplished by quantifying interrelationship between a change in the modal delay Δτ to a change in the tension ΔT with good approximation (where C1 is a constant coefficient) using the following linear relationship:

$$\Delta\tau = C1*\Delta T = -0.003246*\Delta T \quad (EQ. 1)$$

EQ. 1 can be obtained using a linear fit to the data. Using EQ. 1, the results from test fibers 6T can be used to adjust the tension T when forming the (non-test) fiber 6 to be drawn later so that the later drawn fiber has a reduced or minimum modal delay τ and thus a greater bandwidth for the target wavelength $\lambda_T$. The test fibers 6T and later (non-test) fibers 6 can be from the same preform 6P, or can formed from a closely related preform 6PR (see FIG. 4B), such as one of a set of sister preforms made from the same cane or spindles of a lathe that bear sufficiently close refractive index profiles. It is noted here that a fit to the data other than linear can be used (e.g., a polynomial fit can be used) if it is determined that a linear fit is not sufficiently accurate.

For example, if an example test fiber 6T is measured to have a modal delay of τ=0.2 ns/km (corresponding to a bandwidth BW of 1.67 GHz·km according to the relationship BW(τ)=(1/3)·(1/τ)) for a target wavelength $\lambda_T$=850 nm, then increasing the draw tension T by 40 g (i.e., ΔT=40 g), the modal delay τ for the later (non-test) fiber 6 can be reduced to 0.07 ns/km (i.e., Δτ=−0.13 ns/km, which is the modal delay difference induced by the increased draw tension T), which corresponds to a substantially larger bandwidth of BW 4.76 GHz·km, which is almost a factor of 3× improvement in the bandwidth. Different target wavelengths $\lambda_T$ of interest will yield similar coefficients C1 for EQ. 1.

Figure 6:
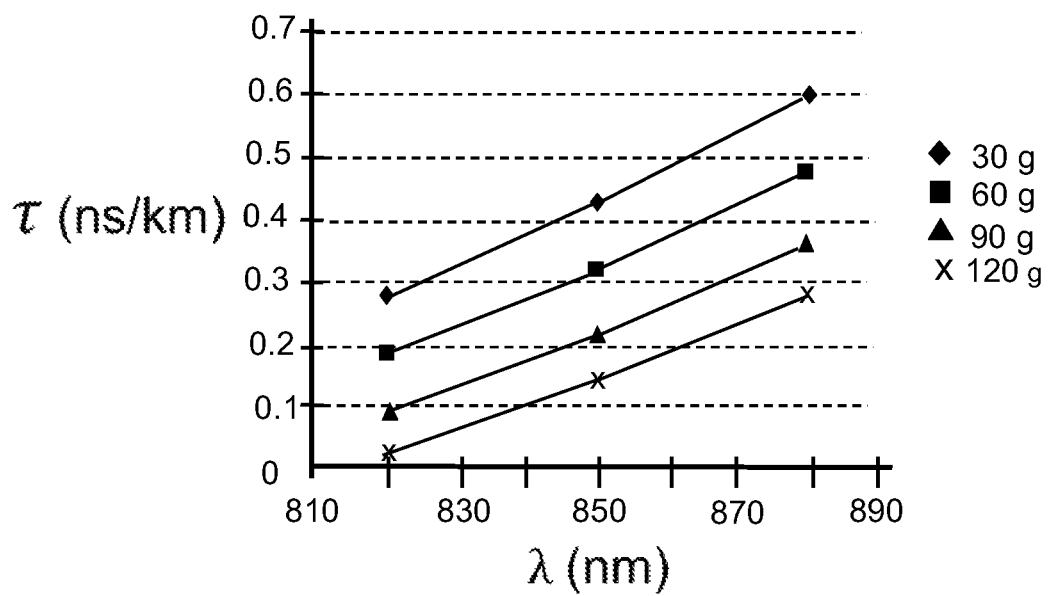
FIG. 6 is a plot of the modal delay $\tau$ (ns/km) as a function of the different measurement wavelengths $\lambda$ (nm) for the different draw tensions T from the test optical fiber measurements set forth in Table 1A, below.

FIG. 6 is a plot of the modal delay τ (ns/km) as a function of the different measurement wavelengths λ for the different draw tensions T from the data in Table 1. As the measurement wavelength increases, the modal delay τ increases. Also, for different tensions T, the different curves have similar slopes. Using the curve for the tension T=60 g, the following interrelationship between the change in the modal delay Δτ and the wavelength λ (in nm) is quantified as follows:

$$\Delta\tau = C2*\Delta\lambda = 0.004858*\Delta\lambda \quad (EQ. 2)$$

Different tensions T will yield similar constant coefficients C2 for EQ. 2.

Equations EQ. 1 and EQ. 2 can be combined as follows so that one can predict the effect of both a tension change ΔT and wavelength change Δλ on the change in the modal delay Δτ:

$$\Delta\tau = C1*\Delta T + C2*\Delta\lambda = -0.003246*\Delta T + 0.004858*\Delta\lambda \quad (EQ. 3)$$

Using EQ. 3, knowing the modal delay τ at one wavelength λ under a specific draw tension T, the modal delay τ at other wavelengths λ and with another draw tension T can be determined. Likewise, EQ. 3 can be used to set a proper tension change ΔT for the non-test fiber 6 relative to the test fiber 6T to have a lower modal delay τ (and thus a higher bandwidth BW) at another wavelength λ.

Example 1: if a test fiber 6T is measured to have a modal delay τ of 0.4216 ns/km at a wavelength λ of 850 nm as formed with a draw tension T of 30 g, then the modal delay τ at a target wavelength $\Delta_T$ of 880 nm and a draw tension T of 60 g for a non-test fiber 6 can calculated to be:

$$\tau = 042 - 0003246*30 + 0004858*30 = 0.4696 \text{ ns/km},$$

which is very close to the measured value as shown in Table 1A, and using the bandwidth equation BW(τ), corresponds to a bandwidth BW(τ) of 0.71 GHz·km, which is close to the corresponding value in Table 1B.

Example 2: if a test fiber 6T is measured to have a modal delay τ of 0.2 ns/km at a wavelength λ of 850 nm with a draw tension T of 30 g, then by EQ. 3 the tension T can be set to a target tension $T_T$ of 136 g for a non-test fiber 6 so that the modal delay τ at a target wavelength $\lambda_T$ of 880 nm for the non-test fiber is essentially 0 ns/km, which corresponds to a bandwidth BW(τ) approaching infinity. This is interpreted to mean that limitations on the bandwidth are due to effects other than delays between the two propagation modes. Such effects can include optical fiber attenuation, chromatic dispersion, etc.

Figure 7:
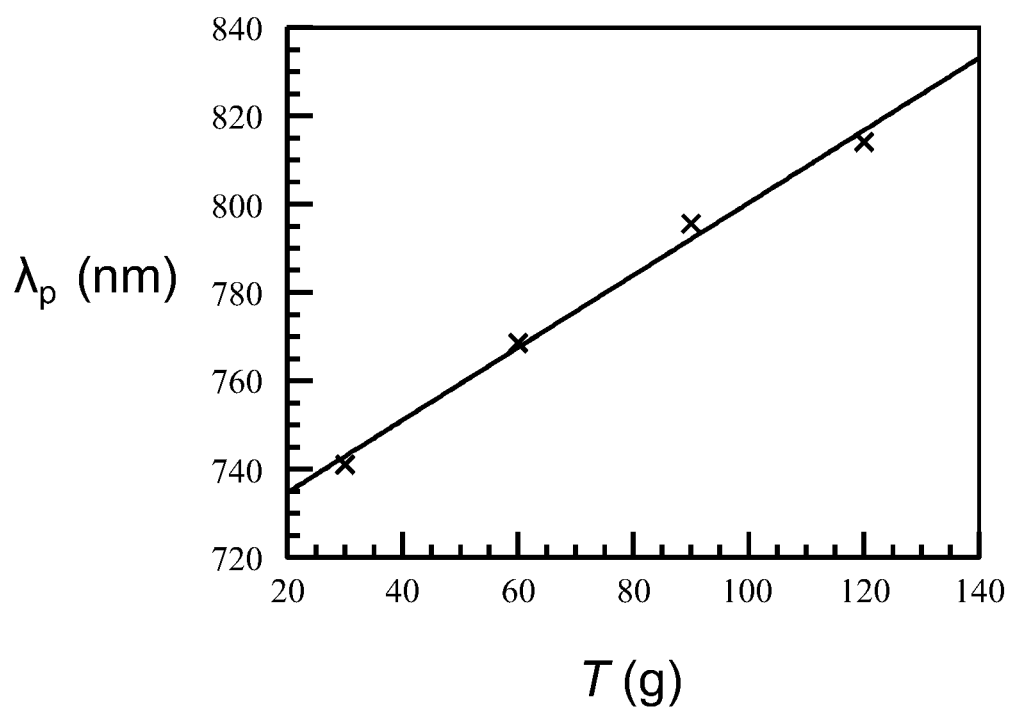
FIG. 7 is a plot of the peak wavelength $\lambda_p$ (nm) to the tension T (g) for measurements made on example test optical fibers.

Measurements of the peak wavelength $\lambda_p$ on a test fiber 6T drawn with different tensions T or separate test fibers 6T drawn with different tensions T allows one to find a correlation between the tension T and the peak wavelength $\lambda_p$. In an example, this can include quantifying the relationship for a tension change ΔT and a change in the peak wavelength $\Delta\lambda_p$. FIG. 7 is a plot of the measured peak wavelength $\lambda_p$ (nm) vs. the tension T (g) for an example test fiber 6T drawing with different tensions T. From the correlation represented by the data in the plot, the following relationship is obtained by quantifying the interrelationship between the tension change ΔT and the change in the peak wavelength Δλ$_p$ (where C3 is a constant coefficient):

$$\Delta\lambda_p = C3*\Delta T = 0.82*\Delta T \quad \text{(EQ. 4)}$$

Using EQ. 4 above, it can be found that every gram of tension change shifts the peak wavelength λ$_p$ by 0.82 nm in the same direction, i.e., an increase in tension increases the peak wavelength. It should be noted that this relationship is opposite to that of a multimode fiber with a 50 micron core size, i.e., the relationship coefficient (slope) has the opposite sign and a different value. This allows for determining a change in tension ΔT to achieve a target peak wavelength λ$_{pT}$.

Figure 8:
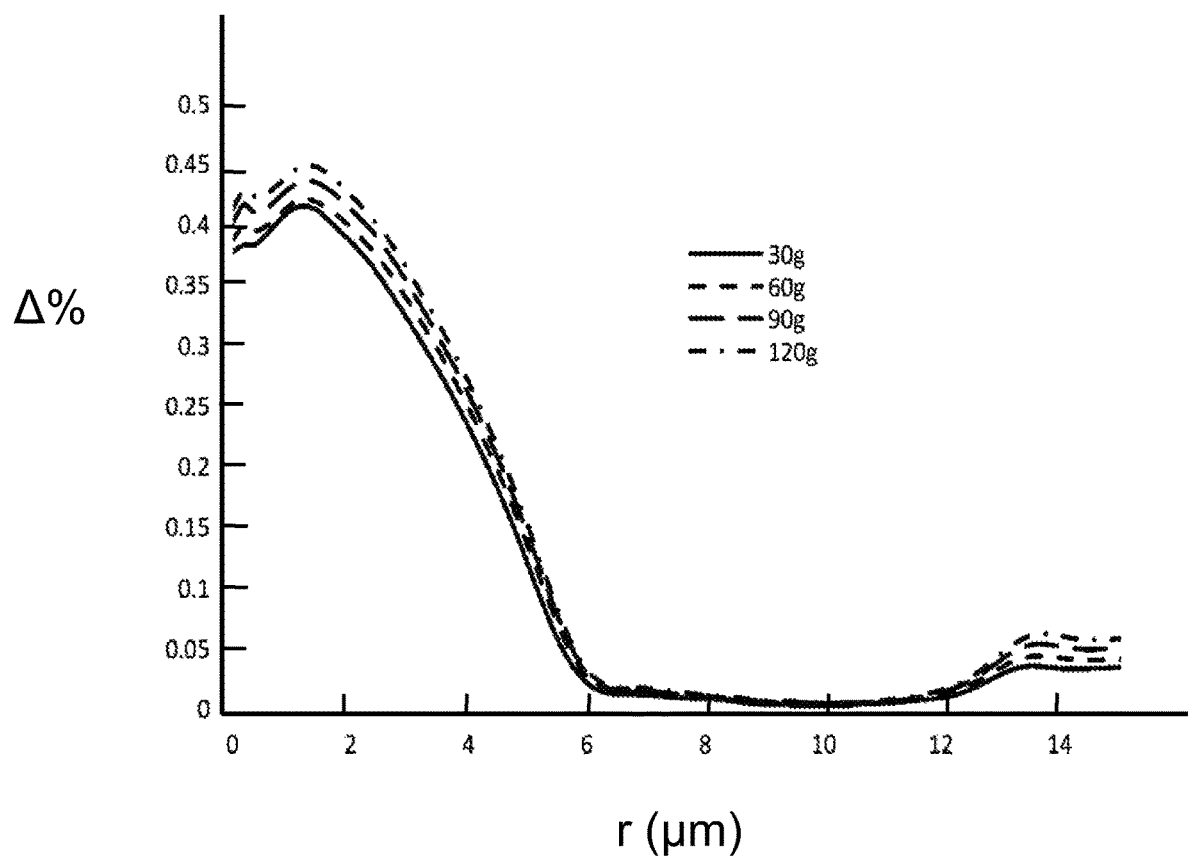
FIG. 8 is a plot of measured relative refractive index profiles $\Delta\%$ (r) versus the radial coordinate r (µm) for test optical fibers formed using different draw tensions T of 30 g, 60 g, 90 g and 120 g, illustrating how a change in the draw tension results in a change in the refractive index profile.

FIG. 8 is a plot of the relative refractive index Δ% (r) versus the radial coordinate r (μm) for the aforementioned example test fibers 6T for the different tensions T of 30 g, 60 g, 90 g and 120 g. Over this range of tensions, the relative refractive index profile values for the different profile sections (core, inner cladding, outer cladding) increase with increasing tension. The example test fibers 6T had a Ge doped core 10 while the cladding 50 was up-doped with C1.

The detailed changes in FIG. 8 were analyzed and the peak delta Δ$_{1max}$, core radius r$_1$ and core alpha value α were extracted. These values are set forth in Table 2, below.

TABLE 2

| T (g) | Δ$_{1max}$ (%) | r$_1$ (μm) | α |
|---|---|---|---|
| 30 | 0.44 | 5.9298 | 1.8898 |
| 60 | 0.442 | 5.99 | 2.0339 |
| 90 | 0.458 | 6.017 | 2.043 |
| 120 | 0.47 | 6.037 | 2.06579 |

It is seen that an increase in the draw tension T causes the peak delta Δ$_{1max}$, the core radius r$_1$ and alpha value α to all increase. Thus, effect of changing the draw tension is to change the profile parameters of the fiber.

The optical properties of the fibers formed using the different tensions per Table 2 are set forth in Table 3. The optical properties considered are the dispersion D (ps/nm/km), the fiber effective area A$_{eff}$ (μm$^2$), and the MFD (μm), considered for two different wavelengths λ of 1310 nm and 1550 nm.

TABLE 3

| Tension T (g) | λ | D (ps/nm/km) | A$_{eff}$ (μm$^2$) | MFD (μm) |
|---|---|---|---|---|
| 30 | 1300 nm | −0.509 | 63.480 | 9.123 |
| | 1550 nm | 16.769 | 80.965 | 10.387 |
| 60 | 1300 nm | −0.0185 | 63.804 | 9.126 |
| | 1550 nm | 17.130 | 80.615 | 10.344 |
| 90 | 1300 nm | −0.087 | 62.648 | 9.034 |
| | 1550 nm | 17.247 | 78.754 | 10.213 |
| 120 | 1300 nm | 0.020 | 61.874 | 8.971 |
| | 1550 nm | 17.346 | 77.478 | 10.121 |

The optical properties listed in Table 3 vary from one tension to another, but all fall within an acceptable range. This illustrates that changes in draw tension can be used to change the optical properties of a fiber as well as the physical dimensions of the fiber.

Figure 9A:
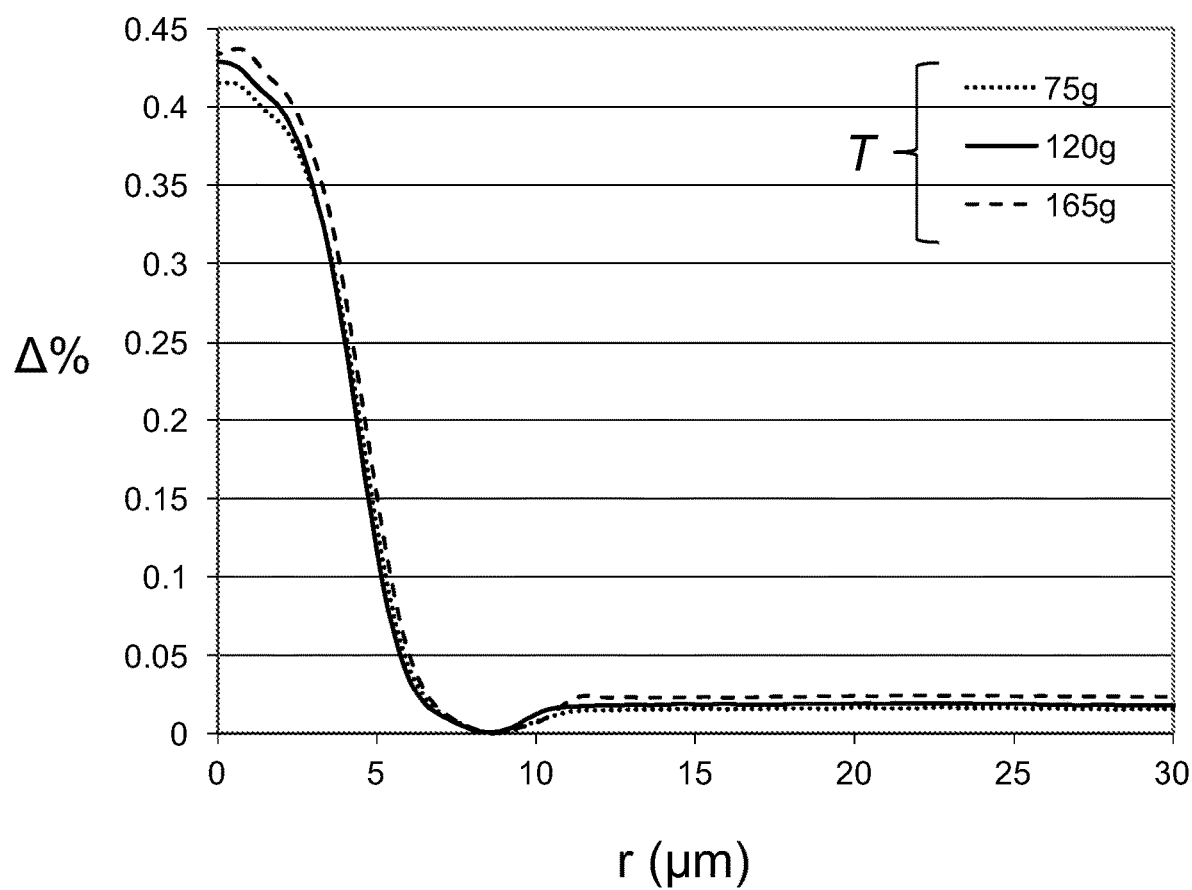
FIGS. 9A and 9B are close-up views of the refractive index profiles of example test optical fibers formed using different draw tensions and illustrate how changes in the draw tension change the refractive index profile.
Figure 9B:
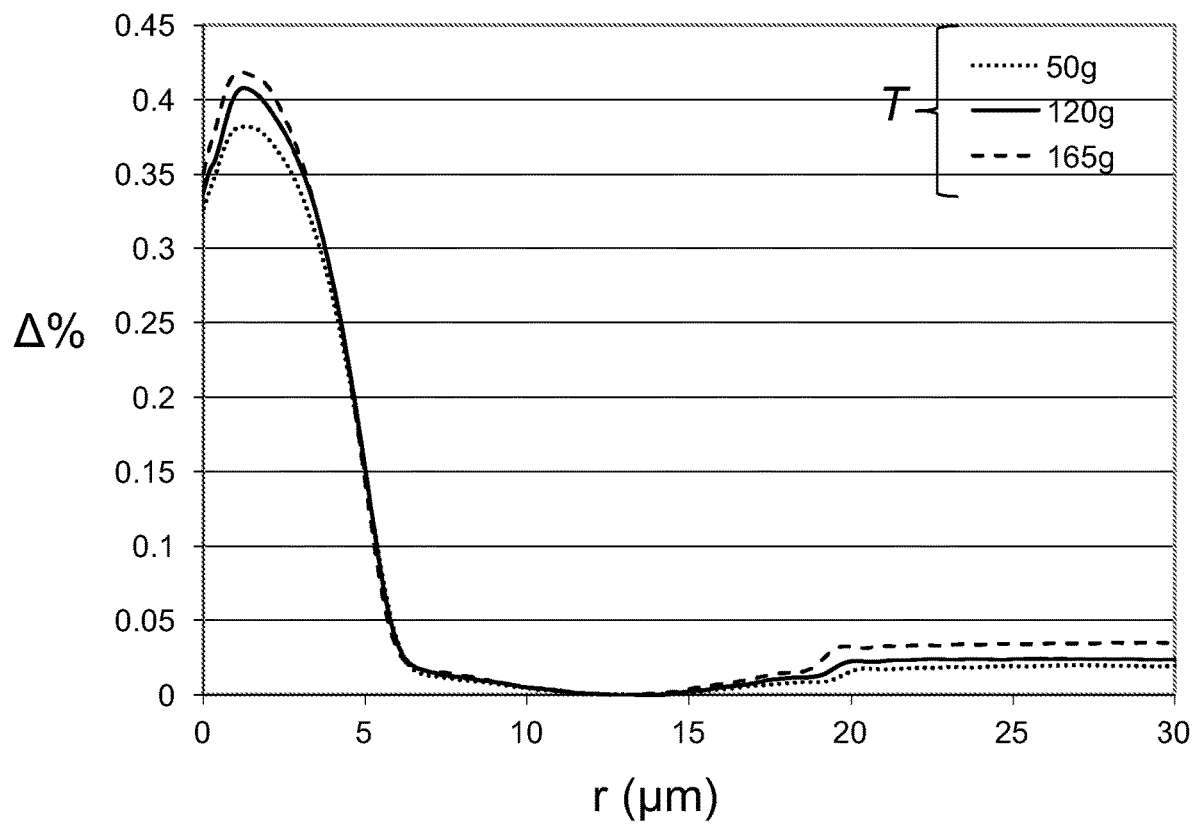

FIGS. 9A and 9B are close-up relative refractive index profile plot for additional test fibers 6T drawn using tensions T of 75 g, 120 g and 165 g (FIG. 9A) and tensions T of 50 g, 120 g and 165 g (FIG. 9B) out to a radial distance of 30 μm. Similar relative refractive index profile changes are observed as in FIG. 8 with increasing draw tension. As the draw tension T increases the core relative refractive index Δ$_1$ increases due to increased stress. Note that the relative refractive index Δ$_1$ (as defined by doping with germania) and the inner and outer cladding (as defined by doping with chlorine) relative refractive indices Δ$_2$ and Δ$_3$ shift by different amount due to different viscosity. This adds to the advantage of manipulating bandwidth in a favorable direction by adjusting the draw tension T.

Figure 10A:
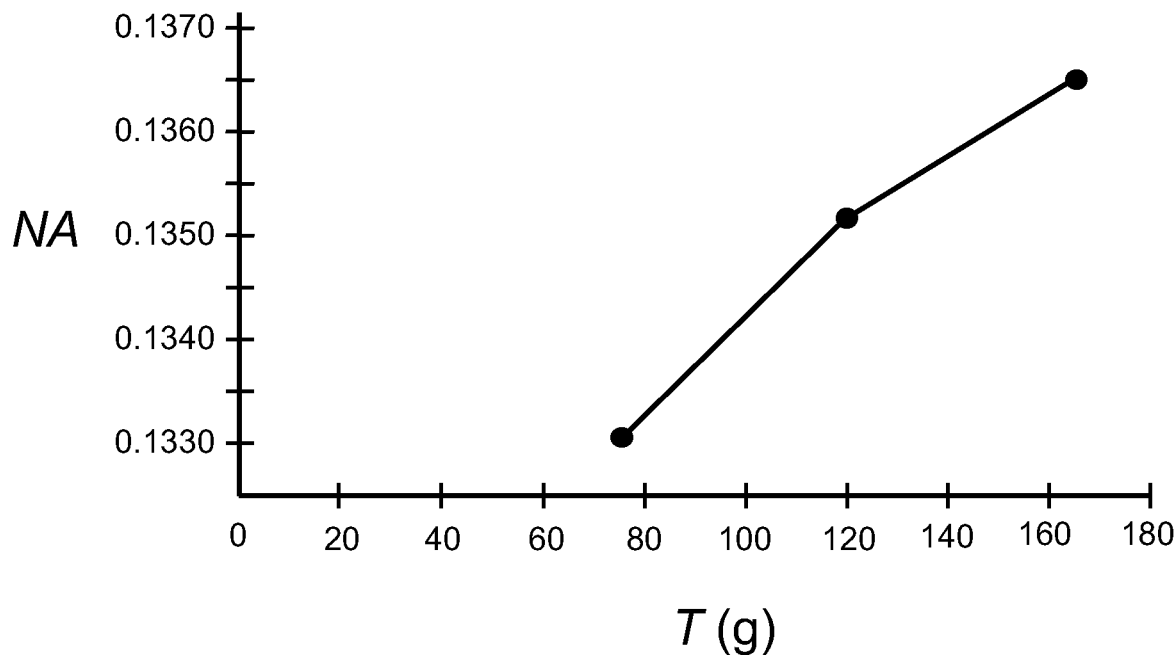
FIGS. 10A and 10B are plots of the modeled numerical aperture NA (unitless) versus the draw tension T (g) for the test optical fibers associated with the plots of FIG. 9A and 9B, respectively.
Figure 10B:
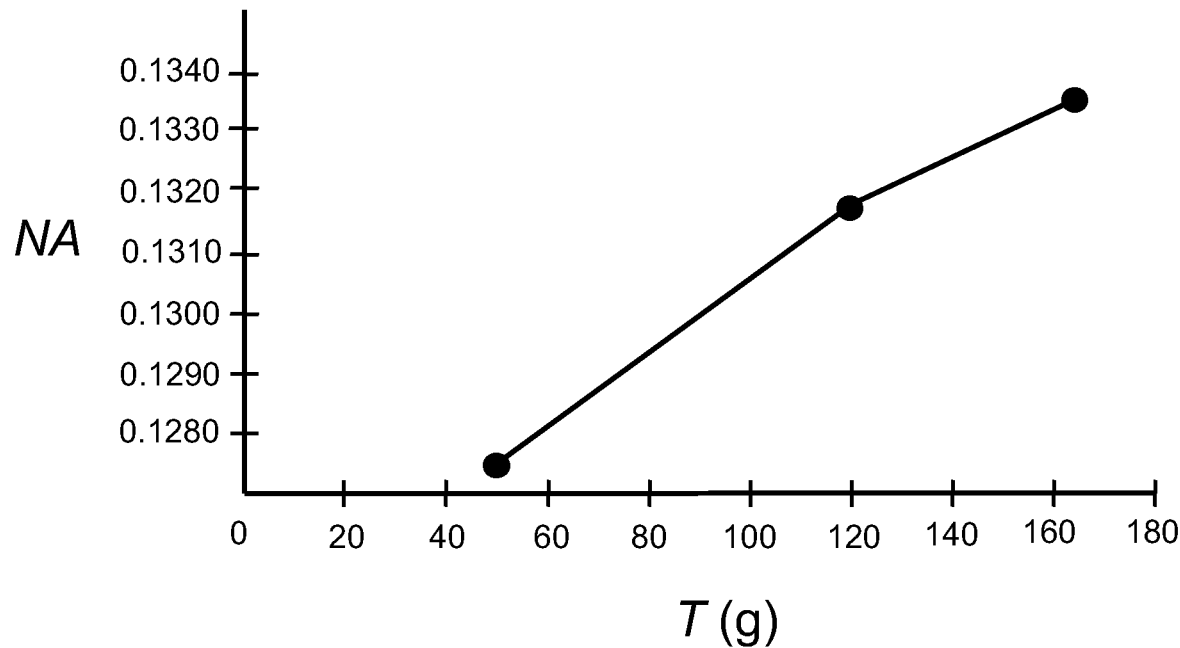

FIGS. 10A and 10B are plots of the calculated numerical aperture NA (unitless) versus the draw tension T (g) for the fibers 6 associated with the plots of FIG. 9A and 9B, respectively. In both plots, the NA increases with draw tension T in a nearly linear fashion so that changes in the NA can be taken into account when optimizing the bandwidth BW, noting that the NA is related to the coupling efficiency between the given multimode light source (e.g., a FM VCSEL) and the fiber 6.

Example Data Transmission Systems

Figure 11:
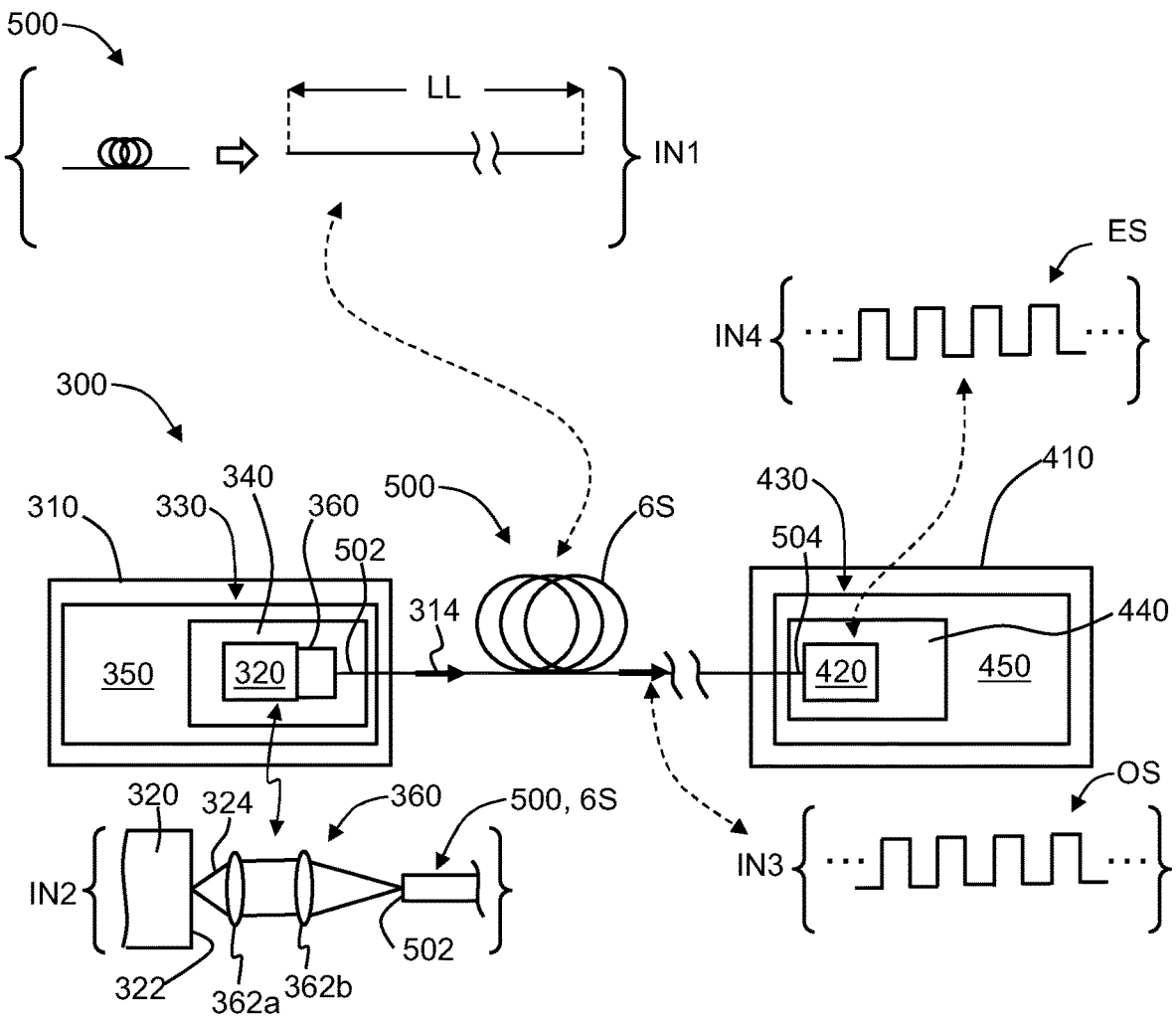
FIG. 11 is a schematic diagram of an example optical fiber data communications system that employs the bandwidth-tuned BM optical fiber disclosed herein to form the optical fiber link between a VCSEL-based transmitter and a receiver.

FIG. 11 is a schematic diagram of an example optical fiber data communications system ("system") 300 that comprises a transmitter 310 and a receiver 410 optically connected by an optical fiber link 500. The optical fiber link 500 comprises at least a section of the fiber 6 formed using the tension-based bandwidth-tuning methods disclosed herein. In an example, the optical fiber link 500 has an input end 502, an output end 504, and link length LL measured along the fiber(s) of the link between the input and output ends (see close-up inset IN1, which shows the optical fiber link 500 "unwound" to show the link length LL of the example systems disclosed herein). In an example, the link length is up to 1000 meters. In an example, the optical fiber link 500 can be constituted by a middle section constituted by a section of the fiber 6 and input and output end sections constituted by relatively short jumper cables (e.g., a few meters long, at most). In an example, the jumper cables can also be made of the fiber 6.

An example transmitter 310 includes a light source 320 such as a VCSEL and a transmitter electronics unit 330 configured to operably support the operation of the light source. In an example, the transmitter electronics unit 330 comprises a transmitter electronic integrated circuit (IC) 340 operably supported by a transmitter circuit board (e.g., a printed circuit board or PCB) 350. In an example, the transmitter electronic IC 340 is configured with a VCSEL driver and related electronic components (not shown) as known in the art.

With reference to the close-up inset IN2 of FIG. 11, the light source 320 has an output end 322 from which light 324 is emitted. In an example, the light 324 is optically coupled into the input end 502 of the optical link 500 (e.g., fiber 6) using a coupling optical system 360. The example coupling optical system 360 comprises first and second lenses 362a and 362b, which in an example are aspherical lens elements. The close-up inset IN3 shows the light 324 comprising optical signals OS.

In an example, the receiver 410 comprises at least one photodetector 420 optically coupled to the output end 504 of the optical fiber link 500. The photodetector 420 is operably supported by a receiver electronics unit 430 configured to operably support the photodetector 420. In an example, the receiver electronics unit 430 comprises a receiver IC 440 operably supported by a receiver circuit board (e.g., a printed circuit board or PCB) 450. In an example, photodetector 420 is configured to convert the optical signals OS encoded on the light 324 into electrical signals ES (see the close-up inset IN4 in FIG. 11), and the receiver IC 440 is configured to receive and process the electrical signals. In an example where the multimode light source 320 such as a VCSEL carries the optical signals at two different wavelengths $\lambda_{V1}$ and $\lambda_{V2}$, the receiver can comprise two photodetectors 420 that respectively detect and receive and convert the first and second optical signals to electrical signals.

The system 300 is configured by virtue of the fiber 6 for SM optical transmission when the light 324 has a wavelength λ above 1260 nm and BM optical transmission in the system 300 is compliant/compatible with the cut-off wavelength $\lambda_C$ and mode field diameter MFD of a standard SM fiber at 1310 nm and 1550 nm for SM operation and is optimized for bandwidth at a target wavelength $\lambda_T$ in the BM wavelength range between 840 nm and 1100 nm for BM transmission with the light source 320, which in an example is a SM or FM light source such as a SM or FM VCSEL.

As discussed above, the target wavelength $\lambda_T$ can be substantially equal to the wavelength $\lambda_V$ of the light source 320 when the optical signals OS are encoded onto a single wavelength $\lambda_V$. In another embodiment, the target wavelength $\lambda_T$ can be substantially midway between two wavelengths $\lambda_{V1}$ and $\lambda_{V2}$ of the light source 320 when the optical signals OS are encoded in the two different $\lambda_{V1}$ and $\lambda_{V2}$.

The systems 300 disclosed herein can be configured to meet a broad range of needs and data transmission applications. In general, the optical signals OS can be modulated using an NRZ modulation format, a PAM4 modulation format or other modulation format used in the art of high-data-rate signal transmission.

For example, for 100 G transmission, most of short distance transmission is based on the QSFP28 form factor with 4×25 G data streams transmitted in and out. The SM/FM VCSELs 320 can be packaged in a VCSEL array 320A to enable 4×25 G transmission using a 25 G NRZ modulation format or a 25 G four-level pulse amplitude (PAM4).

In another example, the light source 320 can comprises a VCSEL driven by 50 G PAM4 electrical signals from the transmitter IC 320 just like a 100 G bidirectional (BiDi) transceiver to achieve 100 G transmission using two wavelengths, for example 850 nm and 900 nm.

In another example, different light sources 320 can be implemented to operate at different wavelengths to enable short wavelength division multiplexing (SWDM) transmission in the manner of conventional 100 G SWDM transceivers. The transceivers can also be implemented to adopt the 400 G transceiver form factor by using one or more of the base technology, such as 50 G PAM4, parallel optics, SWDM to achieve 400 G data rate per transceiver. The fiber and cable structure can be maintained the same as they are used for SM transmission while having the added BM functionality discussed above.

Aspects of the Description

The following Aspects of the description set forth example general properties of the fibers 6 disclosed herein, as well as optical data transmission systems using the fibers, noting that the bandwidth tuning methods can be carried out to form the fibers to have an optimum or near optimum bandwidth (or equivalently, a target peak wavelength) consistent with the described fiber refractive index profile configurations.

Aspect 1 of the description is:

A method of forming a bandwidth-tuned optical fiber for short-length data transmission systems, comprising:

a) establishing a relationship between a change Δτ in a modal delay τ, a change ΔT in a draw tension T and a change Δλ in a bimodal (BM) wavelength λ of light in a BM wavelength range from 840 nm and 1100 nm for a test optical fiber that supports BM operation at the BM wavelength; and b) drawing the bandwidth-tuned optical fiber by setting the draw tension based on said relationship between the change in the modal delay Δτ, the change in the draw tension ΔT and a change Δλ in the BM wavelength Δτ, so that the bandwidth-tuned optical fiber has a target bandwidth greater than 2 GHz·km at a target wavelength within the BM wavelength range.

Aspect 2 of the description is:

The method according to Aspect 1, wherein the test optical fiber is drawn from a preform and the bandwidth-tuned optical fiber is drawn from the preform or from a closely related preform.

Aspect 3 of the description is:

The method according to Aspect 1 or 2, wherein the test optical fiber supports a single mode at a single mode (SM) wavelength in a SM wavelength range of 1260 nm or greater, and wherein said establishing the relationship of act a) comprises:

during said drawing of the test fiber, varying an amount of the draw tension T on the test optical fiber to create different sections of the test optical fiber formed using different amounts of the draw tension T;

measuring a modal delay τ for the different sections of the test optical fiber for different BM wavelengths of light within the BM wavelength range; and quantifying the interrelation between the change Δτ in the modal delay τ, the change ΔT in the draw tension T and the change Δτ in the BM wavelength.

Aspect 4 of the description is:

The method according to Aspect 3, wherein the quantifying of the interrelation comprises approximating by a linear equation $\Delta\tau = C1 \ast \Delta T + C2 \ast \Delta\lambda$, where C1 and C2 are first and second constants, wherein the first constant C1 is determined by a substantially best fit to the change in the mode delay Δτ versus the change in the draw tension ΔT for a given one of the different BM wavelengths of light within the BM wavelength range, and wherein the second constant C2 is determined by a substantially best fit to the change Δτ in the mode delay Δτ versus the change Δτ of the BM wavelength within the BM wavelength range.

Aspect 5 of the description is:

The method according to any of Aspects 1-4, wherein the target bandwidth is greater than 4 GHz·km.

Aspect 6 of the description is:

The method according to any of Aspects 1-5, wherein the target bandwidth is greater than 10 GHz·km.

Aspect 7 of the description is:

The method according to any of Aspects 1-5, wherein the target bandwidth is greater than 20 GHz·km.

Aspect 8 of the description is:

The method according to any of Aspects 1-5, wherein the target bandwidth is in the range from 2 GHz·km to 50 GHz·km.

Aspect 9 of the description is:

The method according to any of Aspects 1-8, wherein target wavelength is substantially the same as a wavelength of light emitted by a vertical cavity surface emitting laser (VCSEL) optically coupled to the bandwidth-tuned optical fiber.

Aspect 10 of the description is:

The method according to Aspect 9, wherein target wavelength resides substantially midway between first and second wavelengths of light emitted by a vertical cavity surface emitting laser (VCSEL) optically coupled to the bandwidth-tuned optical fiber.

Aspect 11 of the description is:

The method according to any of Aspects 1-10, wherein the bandwidth-tuned optical fiber has a mode-field diameter MFD in the range from 8.2 μm≤MFD≤11 μm at an SM wavelength of 1310 nm.

Aspect 12 of the description is:

The method according to any of Aspects 1-11, wherein the bandwidth-tuned optical fiber has attenuation loss less than 0.2 dB/km at an SM wavelength of 1550 nm.

Aspect 13 of the description is:

A method of forming an optical fiber data transmission system comprising:

forming an optical fiber link using the bandwidth-tuned optical fiber formed by the method of any of Aspects 1-12, wherein the optical fiber link has an input end, an output end and a link length LL between the input and output ends, wherein LL<1000 meters;

optically coupling the input end of the optical fiber link to a single mode (SM) VCSEL that emits light having a VCSEL wavelength $\lambda_V$ that is substantially equal to the target wavelength and that carries optical signals at a data rate of at least 10 Gb/s; and optically coupling a photodetector to the output end of the optical fiber link to receive and convert the optical signals to electrical signals.

Aspect 14 of the description is:

A method of forming an optical fiber data transmission system comprising:

forming an optical fiber link using the bandwidth-tuned optical fiber formed by the method of any of Aspects 1-12, wherein the optical fiber link has an input end, an output end and a link length LL between the input and output ends, wherein LL<1000 meters;

optically coupling the input end of the optical fiber link to a single mode (SM) VCSEL that emits light having first and second VCSEL wavelengths $\lambda_{V1}$ and $\lambda_{V2}$ that respectively carry first and second optical signals at a data rate of at least 10 Gb/s, and wherein the target wavelength is substantially midway between the first and second VCSEL wavelengths $\lambda_{V1}$ and $\lambda_{V2}$; and optically coupling first and second photodetectors to the output end of the optical fiber link to respectively receive and convert the first and second optical signals to electrical signals.

Aspect 15 of the description is:

A method of forming a bandwidth-tuned optical fiber, comprising:

a) for a test optical fiber supporting bimodal (BM) operation in a BM wavelength range comprising a plurality of BM wavelengths, establishing a correlation between a modal delay τ, a draw tension T and a BM wavelength λ, the correlation comprising data measured for the test optical fiber;

b) selecting a target draw tension $T_T$ for the bandwidth-tuned optical from the correlation, the target draw tension $T_T$ selected so that the bandwidth-tuned optical fiber has a target bandwidth $BW_T$ at a target BM wavelength $\lambda_T$ within the BM wavelength range; and c) drawing the bandwidth-tuned optical fiber at the target draw tension $T_T$.

Aspect 16 of the description is:

The method according to Aspect 15, wherein the test optical fiber has a cutoff wavelength $\lambda_C$ of 1260 nm or less and wherein the BM wavelength range extends from 840 nm to 1100 nm.

Aspect 17 of the description is:

The method according to Aspect 15 or 16, wherein the establishing a correlation comprises determining a relationship between a change Δτ in the modal delay τ and a change ΔT in the draw tension T.

Aspect 18 of the description is:

The method according to any of Aspects 15-17, wherein the establishing a correlation comprises determining a relationship between a change Δτ in the modal delay τ and a change Δλ in the BM wavelength λ.

Aspect 19 of the description is:

The method according to any of Aspects 15-18, wherein the establishing a correlation comprises determining a relationship between a change Δτ in the draw tension τ and a change Δτ in the BM wavelength λ.

Aspect 20 of the description is:

The method according to any of Aspects 15-19, wherein the establishing a correlation comprises determining a relationship between a change Δτ in the modal delay τ, a change ΔT in the draw tension T, and a change Δλ in the BM wavelength λ.

Aspect 21 of the description is:

The method according to any of Aspects 15-20, wherein the relationship is obtained by a linear fit to the data.

Aspect 22 of the description is:

The method according to any of Aspects 15-21, wherein the BM wavelength BM wavelength λ is a peak wavelength $\lambda_p$.

Aspect 23 of the description is:

The method according to any of Aspects 15-22, wherein the target draw tension $T_T$ is greater than 30 g.

Aspect 24 of the description is:

The method according to any of Aspects 15-23, wherein the target bandwidth $BW_T$ is greater than 2 GHz-km.

Aspect 25 of the description is:

The method according to any of Aspects 15-23, wherein the target bandwidth $BW_T$ is greater than 10 GHz-km.

Aspect 26 of the description is:

The method according to any of Aspects 15-25, further comprising drawing the test optical fiber from a preform.

Aspect 27 of the description is:

The method according to Aspect 26, wherein the bandwidth-tuned optical fiber is drawn from the preform.

Aspect 28 of the description is:

The method according to Aspect 26 or 27, wherein the preform is formed on a lathe, the method further comprising forming a second preform on the lathe and drawing the bandwidth-tuned optical fiber from the second preform.

Aspect 29 of the description is:

A method of forming a bandwidth-tuned non-test optical fiber for short-length data transmission systems, comprising:

a) establishing a relationship between a change Δτ in a modal delay τ and a change ΔT in a draw tension T for a bimodal (BM) target wavelength $\lambda_T$ of light in a BM wavelength range from 840 nm and 1100 nm for a test optical fiber that supports BM operation at the BM target wavelength $\lambda_T$; and b) drawing the bandwidth-tuned optical fiber by changing the amount of draw tension according to the relationship between the change Δτ in the modal delay and the change ΔT in the draw tension T so that the bandwidth-tuned optical fiber has a target bandwidth greater than 2 GHz·km at the target wavelength $\lambda_T$.

Aspect 30 of the description is:
The method according to Aspect 29, wherein the test optical fiber is drawn from a preform and the bandwidth-tuned optical fiber is drawn from the preform or from a closely related preform.

Aspect 31 of the description is:
The method according to Aspect 29 or 30, wherein the test optical fiber supports a single mode at a single mode (SM) wavelength in a SM wavelength range of 1260 nm or greater, and wherein said establishing the relationship of act a) comprises:
during said drawing of the test fiber, varying an amount of a draw tension T on the test optical fiber to create different sections of the test optical fiber formed using different amounts of the draw tension T;
measuring the modal delay $\tau$ for the different sections of the test optical fiber at a target wavelength with the BM wavelength range; and
quantifying the interrelation between the change $\Delta\tau$ in the modal delay $\tau$ and a change $\Delta T$ in the draw tension T at the target wavelength.

Aspect 32 of the description is:
The method according to Aspect 31, wherein the quantifying of the interrelation comprises approximating by a linear equation $\Delta\tau = C1 * \Delta T$, where C1 is a constant determined a substantially best fit to the change $\Delta\tau$ in the mode delay $\tau$ versus the change $\Delta T$ in the draw tension T.

Aspect 33 of the description is:
The method according to any of Aspects 29-32, wherein the target bandwidth is greater than 4 GHz·km.

Aspect 34 of the description is:
The method according to any of Aspects 29-32, wherein the target bandwidth is greater than 10 GHz·km.

Aspect 35 of the description is:
The method according to any of Aspects 29-32, wherein the target bandwidth is greater than 20 GHz·km.

Aspect 36 of the description is:
The method according to any of Aspects 29-32, wherein the target bandwidth is in the range from 2 GHz·km to 50 GHz·km.

Aspect 37 of the description is:
The method according to any of Aspects 29-36, wherein the target wavelength is substantially the same as a wavelength of light emitted by a vertical cavity surface emitting laser (VCSEL) optically coupled to the bandwidth-tuned optical fiber.

Aspect 38 of the description is:
The method according to any of Aspects 29-36, wherein the target wavelength resides substantially midway between first and second wavelengths of light emitted by a vertical cavity surface emitting laser (VCSEL) optically coupled to the bandwidth-tuned optical fiber.

Aspect 39 of the description is:
The method according to any of Aspects 29-38, wherein the bandwidth-tuned optical fiber has a mode-field diameter MFD in the range from 8.2 μm≤MFD≤11 μm at a SM wavelength of 1310 nm.

Aspect 40 of the description is:
The method according to any of Aspects 29-39, wherein the bandwidth-tuned optical fiber has attenuation loss less than 0.2 dB/km at an SM wavelength of 1550 nm.

Aspect 41 of the description is:
A method of forming an optical fiber data transmission system comprising:
forming an optical fiber link using the bandwidth-tuned optical fiber formed by the method of any of Aspects 29-40, wherein the optical fiber link has an input end, an output end and a link length LL between the input and output ends, wherein LL<1000 meters;
optically coupling the input end of the optical fiber link to a single mode (SM) VCSEL that emits light having a VCSEL wavelength $\lambda_V$ that is substantially equal to the target wavelength and that carries optical signals at a data rate of at least 10 Gb/s; and
optically coupling a photodetector to the output end of the optical fiber link to receive and convert the optical signals to electrical signals.

Aspect 42 of the description is:
A method of forming an optical fiber data transmission system comprising:
forming an optical fiber link using the bandwidth-tuned optical fiber formed by the method of any of Aspects 29-40, wherein the optical fiber link has an input end, an output end and a link length LL between the input and output ends, wherein LL<1000 meters;
optically coupling the input end of the optical fiber link to a SM VCSEL that emits light having first and second VCSEL wavelengths $\lambda_{V1}$ and $\lambda_{V2}$ that respectively carry first and second optical signals at a data rate of at least 10 Gb/s, and wherein the target wavelength is substantially midway between the first and second VCSEL wavelengths $\lambda_{V1}$ and $\lambda_{V2}$; and
optically coupling first and second photodetectors to the output end of the optical fiber link to respectively receive and convert the first and second optical signals to electrical signals.

Aspect 43 of the description is:
A method of forming a bandwidth-tuned optical fiber, comprising:
a) for a test optical fiber supporting bimodal (BM) operation in a BM wavelength range comprising a plurality of BM wavelengths, establishing a correlation between a modal delay $\tau$ and a draw tension T for a BM target wavelength $\lambda_T$, the correlation comprising data measured for the test optical fiber; and
b) selecting a target draw tension $T_T$ for the bandwidth-tuned optical from the correlation, the target draw tension $T_T$ selected so that the bandwidth-tuned optical fiber has a target bandwidth $BW_T$ at the BM target wavelength $\lambda_T$; and
c) drawing the bandwidth-tuned optical fiber at the target draw tension $T_T$.

Aspect 44 of the description is:
The method according to Aspect 43, wherein the test optical fiber has a cutoff wavelength $\lambda_C$ of 1260 nm or less and wherein the BM wavelength range extends from 840 nm to 1100 nm.

Aspect 45 of the description is:
The method according to Aspect 43 or 44, wherein the establishing a correlation comprises determining a relationship between a change $\Delta\tau$ in the modal delay $\tau$ and a change $\Delta T$ in the draw tension T.

Aspect 46 of the description is:
The method according to Aspect 45, wherein the relationship is obtained by a linear fit to the data.

Aspect 47 of the description is:
The method according to any of Aspects 43-46, wherein the BM wavelength BM wavelength $\lambda$ is a peak wavelength $\lambda_p$.

Aspect 48 of the description is:
The method according to any of Aspects 43-47, wherein the target draw tension $T_T$ is greater than 30 g.

Aspect 49 of the description is:
The method according to any of Aspects 43-48, wherein the target bandwidth $BW_T$ is greater than 2 GHz-km.

Aspect 50 of the description is:
The method according to any of Aspects 43-48, wherein the target bandwidth $BW_T$ is greater than 10 GHz-km.

Aspect 51 of the description is:
The method according to any of Aspects 43-50, further comprising drawing the test optical fiber from a preform.

Aspect 52 of the description is:
The method according to Aspect 51, wherein the bandwidth-tuned optical fiber is drawn from the preform.

Aspect 53 of the description is:
The method according to Aspect 51 or 52, wherein the preform is formed on a lathe, the method further comprising forming a second preform on the lathe and drawing the bandwidth-tuned optical fiber from the second preform.

Aspect 54 of the description is:
A method of forming a bandwidth-tuned optical fiber for short-length data transmission systems, comprising:
a) establishing a relationship between a change $\Delta\lambda_p$ in a peak wavelength $\lambda_p$ of light that resides within a bimodal (BM) wavelength range from 840 nm and 1100 nm and a change $\Delta T$ in a draw tension T, for a test optical fiber that supports BM operation with the BM wavelength range; and
b) drawing the bandwidth-tuned optical fiber with the draw tension T set according to the relationship between the change $\Delta\lambda_p$ in the peak wavelength $\lambda_p$ and the change $\Delta T$ in the draw tension T to cause the optical fiber to have a target peak wavelength $\lambda_{pT}$ at which the bandwidth-tuned optical fiber has a bandwidth of greater than 2 GHz·km.

Aspect 55 of the description is:
The method according to Aspect 54, wherein the test optical fiber is drawn from a preform and the bandwidth-tuned optical fiber is drawn from the preform or from a closely related preform.

Aspect 56 of the description is:
The method according to Aspect 54 or 55, wherein the test optical fiber supports a single mode at a single mode (SM) wavelength in a SM wavelength range of 1260 nm or greater, and wherein said establishing the relationship of act a) comprises:
during said drawing of the test fiber, varying an amount of a draw tension T on the test optical fiber to create different sections of the test optical fiber formed using different amounts of the draw tension T;
measuring the peak wavelength $\lambda_p$ for the different sections of the test optical fiber; and
quantifying the interrelation between the change $\Delta\lambda_p$ in the peak wavelength $\lambda_p$ and the change $\Delta T$ in the draw tension T.

Aspect 57 of the description is:
The method according to Aspect 56, wherein the quantifying of the interrelation comprises approximating by a linear equation $\Delta\lambda_p = C3 * \Delta T$, where C3 is a constant determined by a substantially best fit to the change $\Delta\lambda_p$ in the peak wavelength $\lambda_p$ versus the change $\Delta T$ in the draw tension T.

Aspect 58 of the description is:
The method according to any of Aspects 54-57, wherein target peak wavelength $\lambda_{pT}$ is substantially the same as a wavelength of light emitted by a vertical cavity surface emitting laser (VCSEL) optically coupled to the bandwidth-tuned optical fiber.

Aspect 59 of the description is:
The method according to any of Aspects 54-57, wherein target peak wavelength $\lambda_{pT}$ resides substantially midway between first and second wavelengths of light emitted by a vertical cavity surface emitting laser (VCSEL) optically coupled to the bandwidth-tuned optical fiber.

Aspect 60 of the description is:
The method according to any of Aspects 54-59, wherein the target bandwidth is greater than 4 GHz·km.

Aspect 61 of the description is:
The method according to any of Aspects 54-59, wherein the target bandwidth is greater than 10 GHz·km.

Aspect 62 of the description is:
The method according to any of Aspects 54-59, wherein the target bandwidth is greater than 20 GHz·km.

Aspect 63 of the description is:
The method according to any of Aspects 54-59, wherein the target bandwidth is in the range from 2 GHz·km to 50 GHz·km.

Aspect 64 of the description is:
The method according to any of Aspects 54-63, wherein the bandwidth-tuned optical fiber has a mode-field diameter MFD in the range from 8.2 µm≤MFD≤11 µm at an SM wavelength of 1310 nm.

Aspect 65 of the description is:
The method according to any of Aspects 54-64, wherein the bandwidth-tuned optical fiber has attenuation loss less than 0.2 dB/km at an SM wavelength of 1550 nm.

Aspect 66 of the description is:
A method of forming an optical fiber data transmission system comprising:
forming an optical fiber link using the bandwidth-tuned optical fiber formed by any of the methods of any of Aspects 54-65, wherein the optical fiber link has an input end, an output end and a link length LL between the input and output ends, wherein LL<1000 meters;
optically coupling the input end of the optical fiber link to a SM VCSEL that emits light having a VCSEL wavelength $\lambda_V$ that is substantially equal to the target peak wavelength $\lambda_{pT}$ and that carries optical signals at a data rate of at least 10 Gb/s; and
optically coupling a photodetector to the output end of the optical fiber link to receive and convert the optical signals to electrical signals.

Aspect 67 of the description is:
A method of forming an optical fiber data transmission system comprising:
forming an optical fiber link using the bandwidth-tuned optical fiber formed by the method of any of Aspects 54-65, wherein the optical fiber link has an input end, an output end and a link length LL between the input and output ends, wherein LL<1000 meters;
optically coupling the input end of the optical fiber link to a SM VCSEL that emits light having first and second VCSEL wavelengths $\lambda_{V1}$ and $\lambda_{V2}$ that respectively carry first and second optical signals at a data rate of at least 10 Gb/s, and wherein the target peak wavelength $\lambda_{pT}$ is substantially midway between the first and second VCSEL wavelengths $\lambda_{V1}$ and $\lambda_{V2}$; and
optically coupling first and second photodetectors to the output end of the optical fiber link to respectively receive and convert the first and second optical signals to electrical signals.

Aspect 68 of the description is:
A method of forming a bandwidth-tuned optical fiber, comprising:
a) for a test optical fiber supporting bimodal (BM) operation in a BM wavelength range comprising a plurality of BM wavelengths, establishing a correlation between a peak wavelength $\lambda_p$ and a draw tension T, the correlation comprising data measured for the test optical fiber; and b) selecting a target draw tension $T_T$ for the bandwidth-tuned optical from the correlation, the target draw tension $T_T$ selected so that the bandwidth-tuned optical fiber has a target bandwidth $BW_T$ at the peak wavelength $\lambda_p$; and c) drawing the bandwidth-tuned optical fiber at the target draw tension $T_T$.

Aspect 69 of the description is:

The method according to Aspect 68, wherein the test optical fiber has a cutoff wavelength $\lambda_C$ of 1260 nm or less and wherein the BM wavelength range extends from 840 nm to 1100 nm.

Aspect 70 of the description is:

The method according to Aspect 68 or 69, wherein the establishing a correlation comprises determining a relationship between a change $\Delta\lambda_p$ in the peak wavelength $\lambda_p$ and a change $\Delta T$ in the draw tension T.

Aspect 71 of the description is:

The method according to Aspect 70, wherein the relationship is obtained by a linear fit to the data.

Aspect 72 of the description is:

The method according to any of Aspects 68-71, wherein the target draw tension $T_T$ is greater than 30 g.

Aspect 73 of the description is:

The method according to any of Aspects 68-72, wherein the target bandwidth $BW_T$ is greater than 2 GHz-km.

Aspect 74 of the description is:

The method according to any of Aspects 68-72, wherein the target bandwidth $BW_T$ is greater than 10 GHz-km.

Aspect 75 of the description is:

The method according to any of Aspects 68-74, further comprising drawing the test optical fiber from a preform.

Aspect 76 of the description is:

The method according to Aspect 75, wherein the bandwidth-tuned optical fiber is drawn from the preform.

Aspect 77 of the description is:

The method according to Aspect 75 or 76, wherein the preform is formed on a lathe, the method further comprising forming a second preform on the lathe and drawing the bandwidth-tuned optical fiber from the second preform.

The bandwidth-tuning methods disclosed herein result in improving the manufacturing yields the BM fibers disclosed and result in lower manufacturing cost for these optical fibers while also providing the highest-value fibers. In particular, the ability to accurately define the fiber bandwidth at a target wavelength means that spools of the BM fiber will more readily meet target design parameters and thus more readily meet target optical performance. This means that the spools of the bandwidth-tuned BM fiber will fall into a higher-priced category of fiber. This is in contrast to the usual practice of measuring the fiber bandwidth of BM fibers after the fact and then categorizing the prices of the spools based on measured bandwidth performance, which varies widely from spool to spool using conventional fiber drawing techniques.

It will be apparent to those skilled in the art that various modifications and variations can be made without departing from the spirit or scope of the claims.

What is claimed is:

1. A method of forming a bandwidth-tuned optical fiber, comprising:
   a) for a BM test optical fiber supporting bimodal operation in a BM wavelength range comprising a plurality of BM wavelengths, establishing a correlation between a modal delay τ, a draw tension T and a BM wavelength λ, the correlation comprising data measured for the BM test optical fiber, the correlation expressed by generating an equation that predicts an effect of both a change in the draw tension T and a change in the BM wavelength λ on a change in the modal delay τ;
   b) selecting a target draw tension $T_T$ for the BM bandwidth-tuned optical fiber from the correlation, the target draw tension $T_T$ selected so that the BM bandwidth-tuned optical fiber has a target bandwidth $BW_T$ at a target BM wavelength $\lambda_T$ within the BM wavelength range; and
   c) drawing the BM bandwidth-tuned optical fiber at the target draw tension $T_T$, wherein a first diameter of a first core of the BM bandwidth-tuned optical fiber is approximately equal to a second diameter of a second core of the BM test optical fiber.

2. The method according to claim 1, wherein the BM test optical fiber has a cutoff wavelength $\lambda_C$ of 1260 nm or less and wherein the BM wavelength range extends from 840 nm to 1100 nm.

3. The method according to claim 1, wherein the establishing a correlation comprises determining a relationship between a change Δτ in the modal delay τ and a change ΔT in the draw tension T.

4. The method according to claim 1, wherein the establishing a correlation comprises determining a relationship between a change Δτ in the modal delay τ and a change Δλ in the BM wavelength λ.

5. The method according to claim 1, wherein the establishing a correlation comprises determining a relationship between a change ΔT in the draw tension T and a change Δλ in the BM wavelength λ.

6. The method according to claim 1, wherein the establishing a correlation comprises determining a relationship between a change Δτ in the modal delay τ, a change ΔT in the draw tension T, and a change Δλ in the BM wavelength λ.

7. The method according to claim 1, wherein the relationship is obtained by a linear fit to the data.

8. The method according to claim 1, wherein the BM wavelength BM wavelength λ is a peak wavelength $\lambda_p$.

9. The method according to claim 1, wherein the target draw tension $T_T$ is greater than 30 g.

10. The method according to claim 1, wherein the target bandwidth $BW_T$ is greater than 2 GHz-km.

11. The method according to claim 1, wherein the target bandwidth $BW_T$ is greater than 10 GHz-km.

12. The method according to claim 1, further comprising drawing the BM test optical fiber from a preform.

13. The method according to claim 12, wherein the BM bandwidth-tuned optical fiber is drawn from the preform.

14. The method according to claim 12, wherein the preform is formed on a lathe, the method further comprising forming a second preform on the lathe and drawing the BM bandwidth-tuned optical fiber from the second preform.

15. The method of claim 1, wherein the BM bandwidth-tuned optical fiber and the BM test optical fiber both support a maximum of two modes.

16. A method of forming a bimodal (BM) bandwidth-tuned optical fiber, comprising:
   a) for a BM test optical fiber supporting bimodal operation in a BM wavelength range comprising a plurality of BM wavelengths, establishing a correlation comprising data measured for the BM test optical fiber, the correlation is determined by an equation that expresses a modal delay τ as a function of a change in both the draw tension T and a change in the BM wavelength λ, wherein given a first modal delay τ1 at a first BM wavelength $\lambda_1$ under a first draw tension $T_1$, a second modal delay τ2 at a second BM wavelength $\lambda_2$ under a second draw tension $T_2$ may be determined from the equation;

b) determining a target draw tension $T_T$ and a target BM wavelength $\lambda_T$ that correlate to a target modal delay τT based on the equation for the BM bandwidth-tuned optical fiber; and c) drawing the BM bandwidth-tuned optical fiber at the target draw tension $T_T$, wherein a first diameter of a first core of the BM bandwidth-tuned optical fiber is approximately equal to a second diameter of a second core of the BM test optical fiber.

17. The method according to claim 16, wherein the BM test optical fiber has a cutoff wavelength $\lambda_C$ of 1260 nm or less and wherein the BM wavelength range extends from 840 nm to 1100 nm.

18. The method according to claim 16, wherein the target draw tension $T_T$ is greater than 30 g.

19. The method according to claim 16, wherein the target bandwidth $BW_T$ is greater than 2 GHz-km.

20. The method according to claim 16, wherein the target bandwidth $BW_T$ is greater than 10 GHz-km.

21. The method according to claim 16, further comprising drawing the BM test optical fiber from a preform.

22. The method according to claim 21, wherein the BM bandwidth-tuned optical fiber is drawn from the preform.

23. The method according to claim 21, wherein the preform is formed on a lathe, the method further comprising forming a second preform on the lathe and drawing the BM bandwidth-tuned optical fiber from the second preform.

* * * * *

UNITED STATES PATENT AND TRADEMARK OFFICE
CERTIFICATE OF CORRECTION

PATENT NO. : 12,151,964 B2
APPLICATION NO. : 16/936991
DATED : November 26, 2024
INVENTOR(S) : Xin Chen et al.

Page 1 of 1

It is certified that error appears in the above-identified patent and that said Letters Patent is hereby corrected as shown below:

In the Claims

In Column 25, Line 63, in Claim 1, insert -- bimodal (BM) --.

Signed and Sealed this
Fourth Day of November, 2025

John A. Squires
*Director of the United States Patent and Trademark Office*